(12) United States Patent
Hussein

(10) Patent No.: US 11,858,562 B2
(45) Date of Patent: Jan. 2, 2024

(54) LAND VEHICLE DRAG REDUCTION DEVICE AND METHOD

(71) Applicant: Energy Horizon LLC, Colorado Springs, CO (US)

(72) Inventor: Ibrahim Rafaat Mahmoud Morsi Hussein, Lafayette, CO (US)

(73) Assignee: Energy Horizon LLC, Colorado Springs, CO (US)

( * ) Notice: Subject to any disclaimer, the term of this patent is extended or adjusted under 35 U.S.C. 154(b) by 261 days.

(21) Appl. No.: 17/357,241

(22) Filed: Jun. 24, 2021

(65) Prior Publication Data
US 2021/0403100 A1 Dec. 30, 2021

Related U.S. Application Data

(60) Provisional application No. 63/043,455, filed on Jun. 24, 2020.

(51) Int. Cl.
*B62D 35/00* (2006.01)

(52) U.S. Cl.
CPC ......... *B62D 35/001* (2013.01); *B62D 35/007* (2013.01)

(58) Field of Classification Search
CPC ............................ B62D 35/001; B62D 35/007
See application file for complete search history.

(56) References Cited

U.S. PATENT DOCUMENTS

| | | | |
|---|---|---|---|
| 2,361,924 A | 11/1944 | Boynton | |
| 4,787,666 A * | 11/1988 | Noel | B62D 35/001 296/180.1 |
| 4,917,434 A | 4/1990 | Sumitani | |
| 5,374,013 A | 12/1994 | Bassett et al. | |
| 5,407,245 A | 4/1995 | Geropp | |
| 7,185,944 B2 | 3/2007 | Shahbazi | |

(Continued)

FOREIGN PATENT DOCUMENTS

| | | | | |
|---|---|---|---|---|
| EP | 1426577 A1 * | 6/2004 | ............ | B60K 11/04 |
| EP | 1506911 A1 | 2/2005 | | |

(Continued)

OTHER PUBLICATIONS

International Search Report for Application No. PCT/US2021/038864 dated Sep. 30, 2021, 13 pages.

(Continued)

*Primary Examiner* — Lori Lyjak
(74) *Attorney, Agent, or Firm* — Howard & Howard Attorneys PLLC

(57) ABSTRACT

A drag reduction device for improving drag efficiency on a land vehicle includes one or more drag reduction devices that are coupled to an exterior portion or contained internally within the vehicle. The drag reduction devices include one or more fan assemblies each contained within a respective housing. The fan assemblies all include, in general, cross-flow fans and air foils that are configured to adjust the movement of air over and around the trailer unit as the land vehicle is being driven along a surface during normal use, and thus provide reduced resistance from air friction and pressure friction and contribute significantly to reduced fuel or other energy consumption as the land vehicle is being driven along a surface during normal use. The fan blades and air foils can be plasma-controlled.

22 Claims, 13 Drawing Sheets

(56) References Cited

U.S. PATENT DOCUMENTS

| | | |
|---|---|---|
| 7,226,119 B1 | 6/2007 | Weaver |
| 7,364,220 B2 | 4/2008 | Shahbazi |
| 8,205,932 B1 | 6/2012 | Houk |
| 10,040,332 B2 | 8/2018 | Lawrence et al. |
| 10,093,363 B2 | 10/2018 | Brereton et al. |
| 2006/0266882 A1 | 11/2006 | Kummer et al. |
| 2011/0011072 A1* | 1/2011 | Watts ..................... F03D 9/25 60/327 |
| 2017/0183043 A1 | 6/2017 | Connors |
| 2017/0240226 A1 | 8/2017 | Brooks et al. |

FOREIGN PATENT DOCUMENTS

| | | | | |
|---|---|---|---|---|
| EP | 2011723 A2 * | 1/2009 | ........... | B62D 35/007 |
| FR | 2613682 A * | 10/1988 | ........... | B62D 35/001 |
| GB | 2269142 B | 12/1995 | | |
| WO | 2016151319 A1 | 9/2016 | | |
| WO | 2018017521 A1 | 1/2018 | | |

OTHER PUBLICATIONS

English language abstract and machine-assisted English translation for EP1506911 extracted from espacenet.com database on Nov. 29, 2021, 22 pages.

* cited by examiner

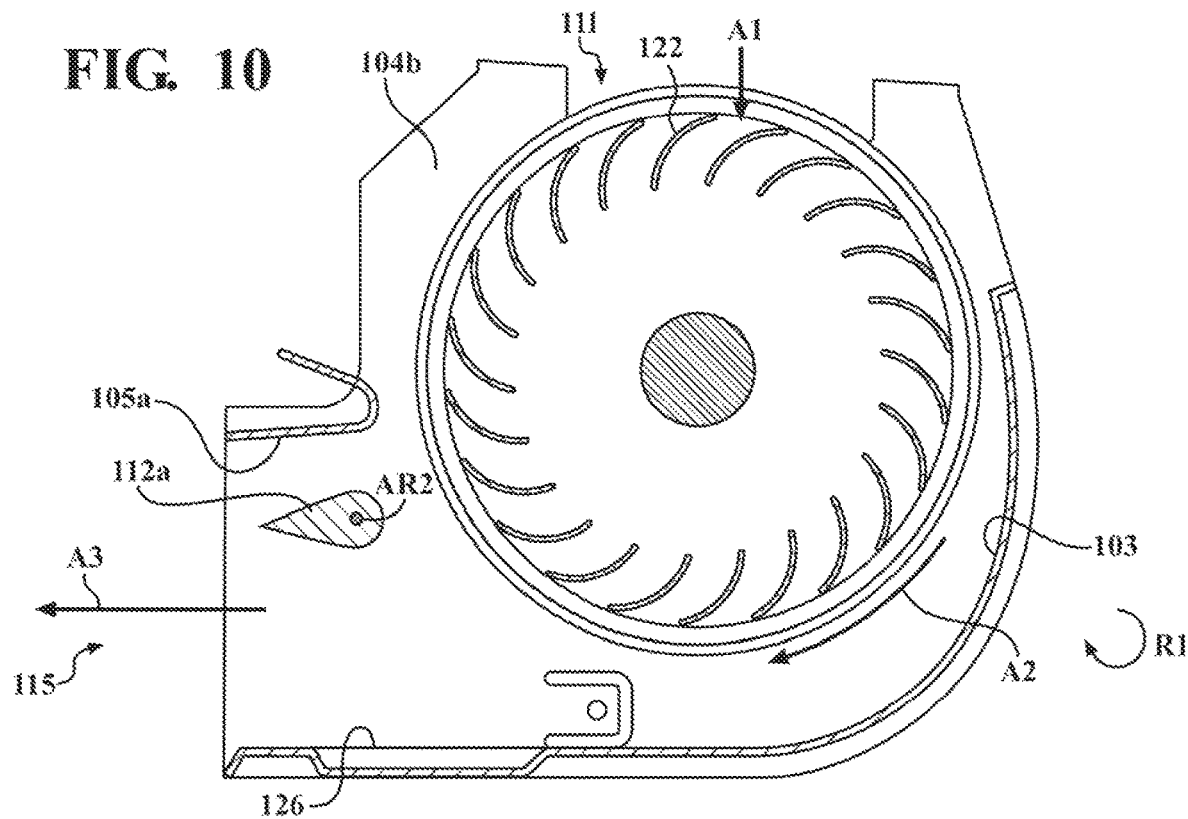
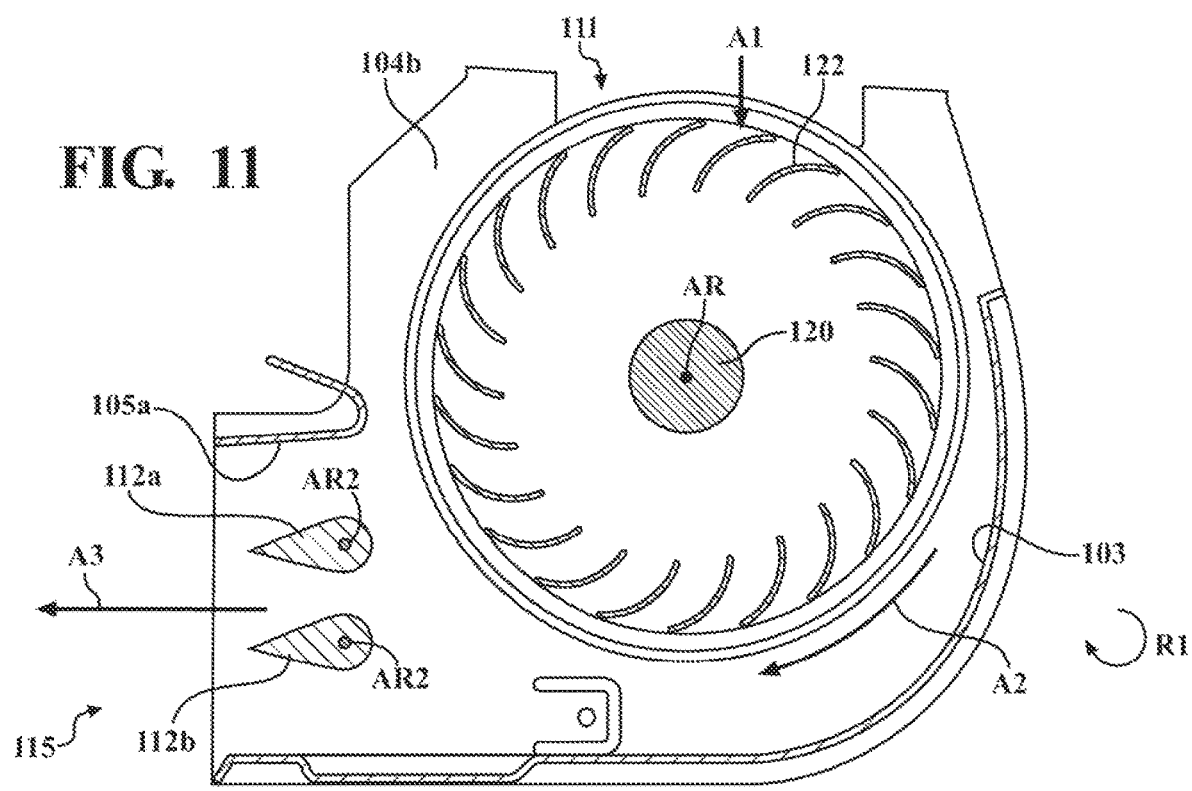

LAND VEHICLE DRAG REDUCTION DEVICE AND METHOD

CROSS REFERENCE TO RELATED APPLICATIONS

The present disclosure claims priority from U.S. Provisional App. Ser. No. 63/043,455, filed Jun. 24, 2020, the entirety of which is herein incorporated by reference.

TECHNICAL FIELD

The present invention relates, generally, to devices introduced onto land vehicles to reduce drag, and associated methods for reducing drag on land vehicles.

BACKGROUND

The trucking industry has become an increasingly and vital component of the world's economy, as customers large and small are now ordering more items for shipment and expect to receive those ordered items very quickly. The trucking industry continues to provide the most efficient and versatile means for meeting these customer's demands.

According to the American Trucking Association, nearly 71% of all freight tonnage in the United States, accounting for more than 10.5 billion tons of freight annually, is moved by truck. The American Trucking Association also notes that moving 10.5 billion tons of freight annually requires more than 3.6 million heavy-duty Class 8 trucks (i.e., Class 8 tractor-trailers) and over 3.5 million professional truck drivers.

Further, the American Trucking Association estimates that registered trucks traveled approximately 297.6 billion miles in 2017. According to a chart provided at https://afdc.energy.gov/data/10310, citing Federal Highway Administration Highway Statistics 2016, Class 8 trucks average a little over 5 miles per gasoline-gallon equivalents. The U.S. Energy Information Administration (EIA) estimates that in 2018, diesel (distillate) fuel consumption in the U.S. transportation sector resulted in the emission of 461 million metric tons of carbon dioxide ($CO_2$), a greenhouse gas.

While the trucking industry continues to make strides related to improved fuel economy and reduced emissions for gas or diesel powered trucks, there is still room for improvement. Moreover, even with the introduction of electrically powered trucks which require less fuel, such electrically powered trucks typically need fuel for the producing, transmitting, and storing of electricity, and associated improvement in fuel economy is still desired.

Another aspect related to fuel economy and emissions relates to the movement of air over and around the trucks (i.e., aerodynamic drag) as the trucks are being driven. In particular, resistance from air friction and pressure friction is known to contribute significantly to fuel or other energy consumption.

The devices and methods of the subject disclosure directed to improving drag efficiency by redirecting air may address some of the deficiencies described above or address other aspects of the prior art.

SUMMARY OF THE INVENTION

The present invention is directed to devices and associated methods for improving drag efficiency (i.e., reducing drag) on a land vehicle that includes a cab unit and a trailer unit.

In particular, the present invention provides for the introduction of one or more drag reduction devices that are coupled to an exterior portion of the trailer unit, or within a portion of a trailer unit, of the land vehicle. The drag reduction devices in accordance with each of the exemplary embodiment provided below include one or more fan assemblies each contained within a respective housing. The fan assemblies all include, in general, cross-flow fans and air foils that are configured to adjust the movement of air over and around the trailer unit as the land vehicle is being driven along a surface during normal use at a particular vehicle speed. Accordingly, the one or more drag reduction devices described in the representative embodiments herein provide reduced resistance from air friction and pressure friction, and thereby contribute significantly to reduced fuel or other energy consumption as the land vehicle is being driven along a surface during normal use at the particular vehicle speed.

BRIEF DESCRIPTION OF THE DRAWINGS

Advantages of the present invention will be readily appreciated as the same becomes better understood by reference to the following detailed description when considered in connection with the accompanying drawings.

FIG. 10 is a front side view of the drag reduction device in accordance with another exemplary embodiment with one air foil in the non-pivoted position with the curvature of the fan blades corresponding to that in the exemplary embodiment of FIGS. 4-7.

FIG. 11 is a front side view of the drag reduction device in accordance with another exemplary embodiment with two air foil sin the non-pivoted position with the curvature of the fan blades corresponding to that in the exemplary embodiment of FIGS. 4-7.

DETAILED DESCRIPTION

Examples of the subject disclosure relate to devices and systems configured to improve vehicle aerodynamics by reducing drag, and thus improving fuel efficiency.

Reference will now be made in detail to examples of the present disclosure described above and illustrated in the accompanying drawings. Wherever possible, the same reference numbers will be used throughout the drawings to refer to the same or like parts.

Figure 1:
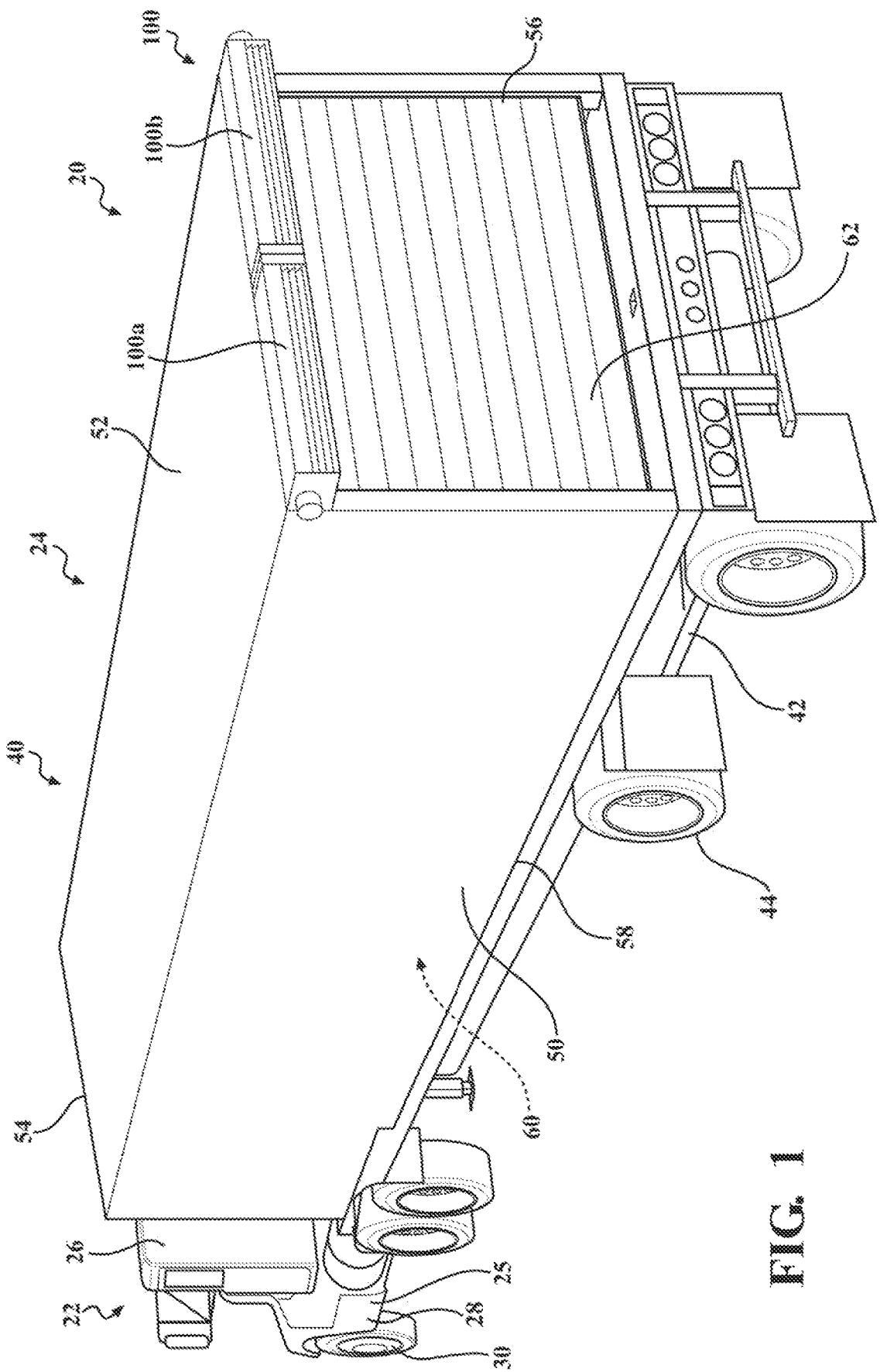
FIG. 1 is a perspective rear view of a transport vehicle including one or more drag reduction devices in accordance with the subject disclosure.

Referring to FIG. 1, a transport vehicle, sometimes referred to as a land vehicle 20, and in particular here shown as a semi-tractor-trailer truck (i.e., a semi or semi-tractor), may include a cab unit 22 and a trailer unit 24.

The cab unit 22 (sometimes alternatively referred to as a tractor unit 22) may be a tractor-trailer type cab unit, which may be powered by a diesel engine, electric engine, hybrid engine, or any other power source. The cab unit 22 typically includes a passenger compartment 26 positioned atop a cab frame 28 that includes a plurality of wheels 30 rotatably coupled to the cab frame 28 and positioned along the outer periphery of the cab frame 28. The trailer unit 24 (sometimes alternatively referred to as a semi-trailer unit 24) may be any appropriate trailer known in the trucking industry and may be integral with the cab unit 22 or separately coupled to the cab unit 22 (such as shown in FIG. 1). The cab unit 22 may also include any appropriate coupling to and electrical connection with the trailer unit 24 such that electrical signals or other types of signals may be transmitted between the cab unit 22 and the trailer unit 24.

The trailer unit 24 includes a container, shown in the Figures as a generally box-shaped container 40 that is positioned on a trailer frame 42 that includes a plurality of wheels 44 rotatably coupled to the trailer frame 42 and positioned along the outer periphery of the trailer frame 42.

In the embodiments shown, the box-shaped container 40 includes a pair of side walls 50, a top wall 52, a front wall 54, a rear wall 56, and a bottom wall 58 that collectively define an interior storage compartment 60 that is used to store items for transport. As illustrated, the front wall 54 is positioned adjacent to the cab unit 22 when the trailer unit 24 is coupled to the cab unit 22, and in the coupled position is positioned between the passenger compartment 26 and the rear wall 56. At least a portion of one of the walls 50, 52, 54, 56, 58 includes at least one door or access feature that allows for access to the interior storage compartment 60.

In FIG. 1, a roll-up door 62 is provided within a portion of the rear wall 56 to allow access to the interior storage department 60, although in alternative embodiments different types of doors could be provided within a portion of the rear wall, such as side-by-side doors. Still further, additional doors or access features could be provided in one of the side walls 50, or in the top wall 52, or front wall 54, or bottom wall 58 (in addition to or replacing the roll-up door 62) to provide access to the interior storage compartment.

As also shown in FIG. 1, the land vehicle 20 includes one or more drag reduction devices 100 that are positioned along the trailer unit 24, and in particular in the exemplary embodiments provided herein are positioned near the edge of the trailer unit 24 at the intersection of the top wall 52 and rear wall 56. In alternative embodiments (not shown), such drag reduction devices 100 may be provided near the edge of the trailer unit at the intersection of one of the side walls 50 and the top wall 52, or the front wall 54, or the bottom wall 58.

The drag reduction devices 100, in accordance with each of the exemplary embodiment provided herein, include one or more fan assemblies 110 each contained within a respective housing 102. The fan assemblies 110 provided herein all include, in general, cross-flow fans (i.e., tangential fans) and air foils that are configured to adjust the movement of air over and around the trailer unit 24 as the land vehicle 20 is being driven along a surface during normal use. Accordingly, the one or more drag reduction devices 100 described in the representative embodiments herein provide reduced resistance from air friction and pressure friction, and thereby contribute significantly to reduced fuel or other energy consumption as the land vehicle 20 is being driven along a surface during normal use.

Figure 19:
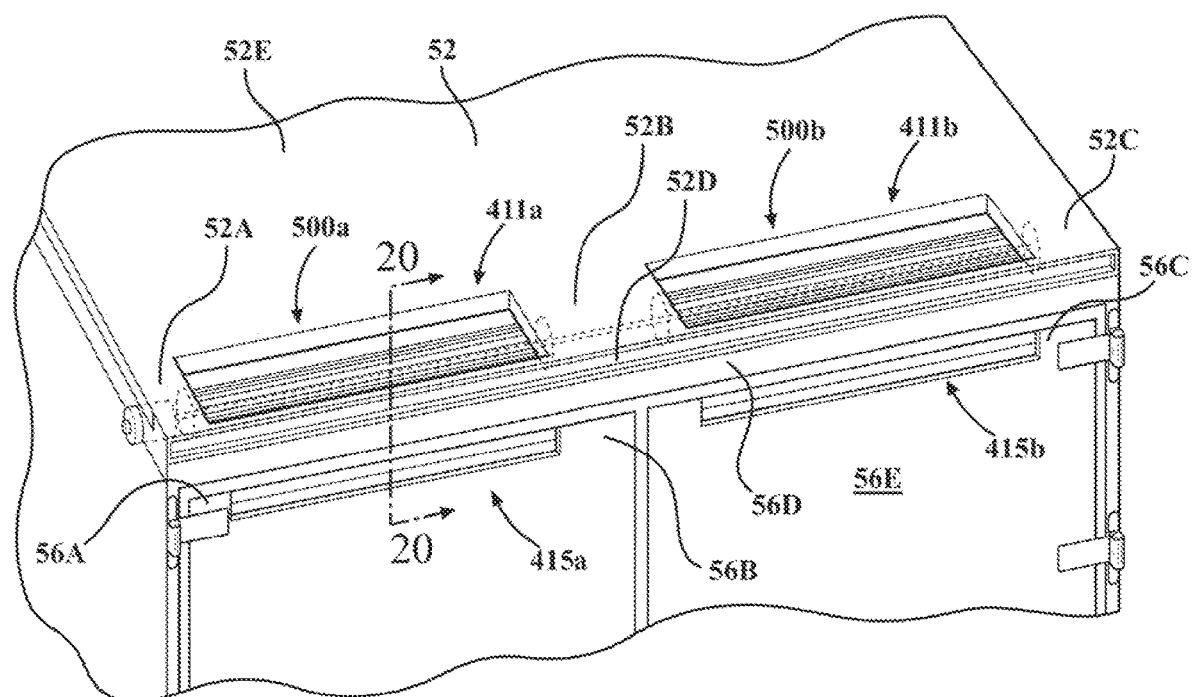
FIG. 19 is a rear perspective view of a portion of a portion of the transport device having two internal drag reduction devices in accordance with another exemplary embodiment.
Figure 20:
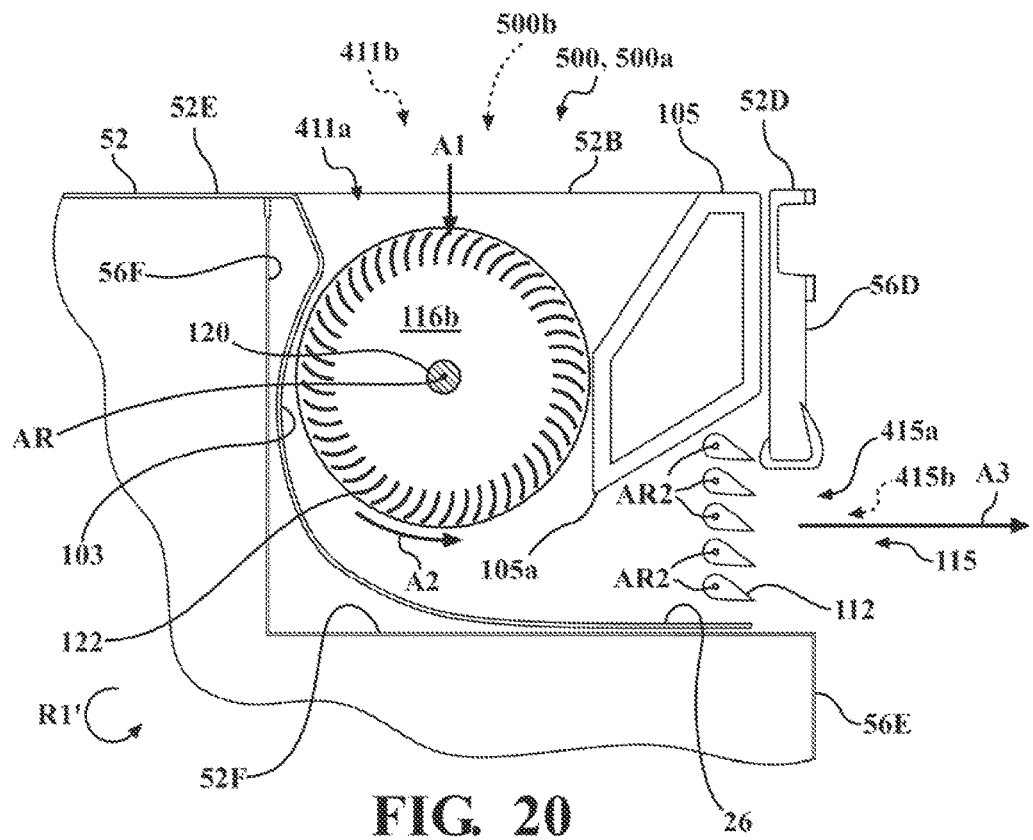
FIG. 20 is a side section view of FIG. 19 taken along line 20-20.

The present disclosure provides one or more drag reduction devices 100, in certain embodiments such as provided in FIGS. 2-16, that are coupled to, and extend outwardly from, the exterior of the trailer unit 24 at a desired location. In other exemplary embodiments, as illustrated in FIGS. 19 and 20, the one or more drag reduction devices 100 are located internally to a portion of the trailer unit 24, as will be described in further detail below. The representative embodiments of the drag reduction devices 100 as illustrated are conceptual in nature and are not intended to be limited to the embodiments as illustrated.

Figure 2:
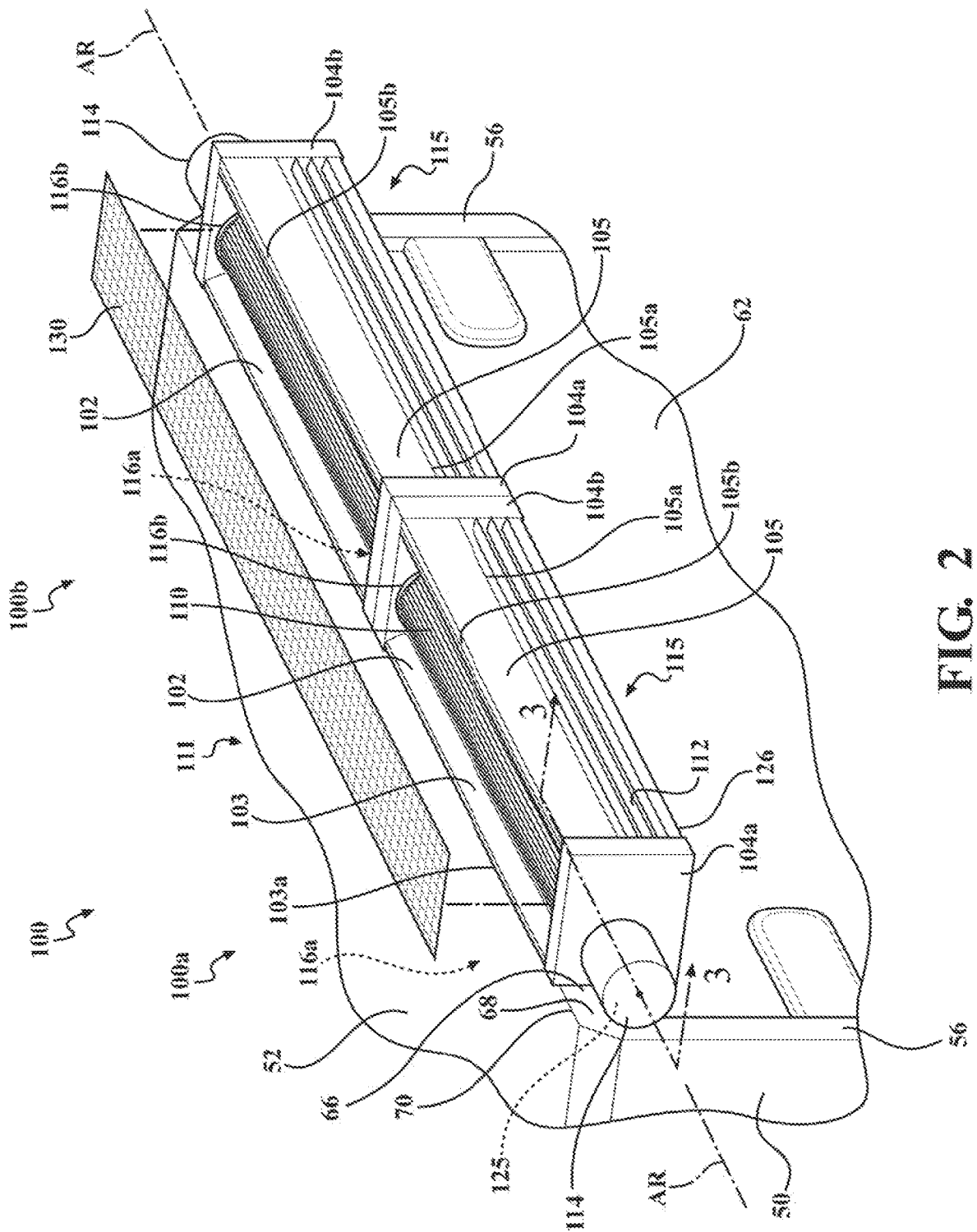
FIG. 2 is a close up perspective view of the one or more drag reduction devices of FIG. 1 in accordance with one exemplary embodiment of the subject disclosure.
Figure 3:
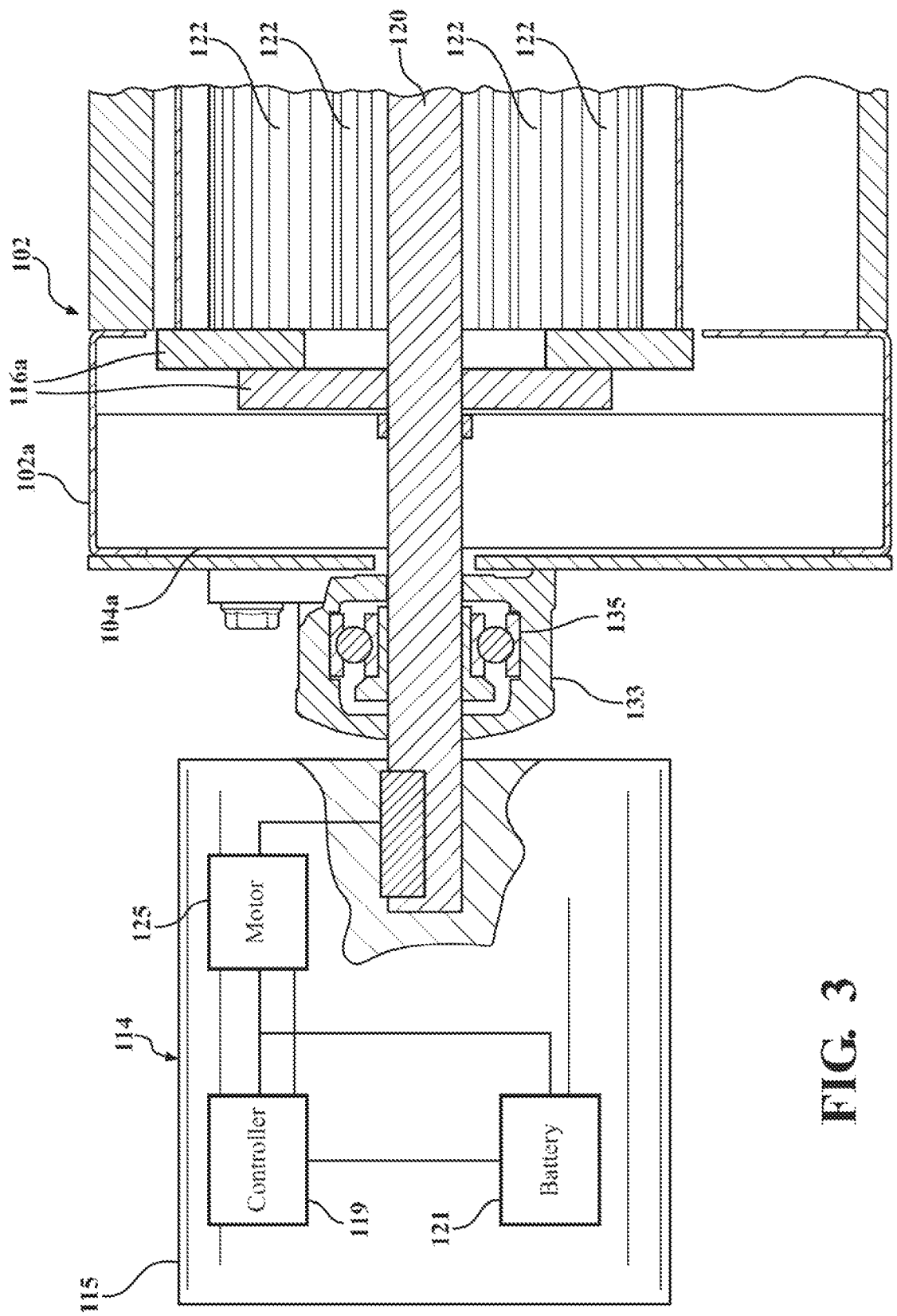
FIG. 3 is a section view of a portion of FIG. 2 taken along line 3-3.
Figure 4:
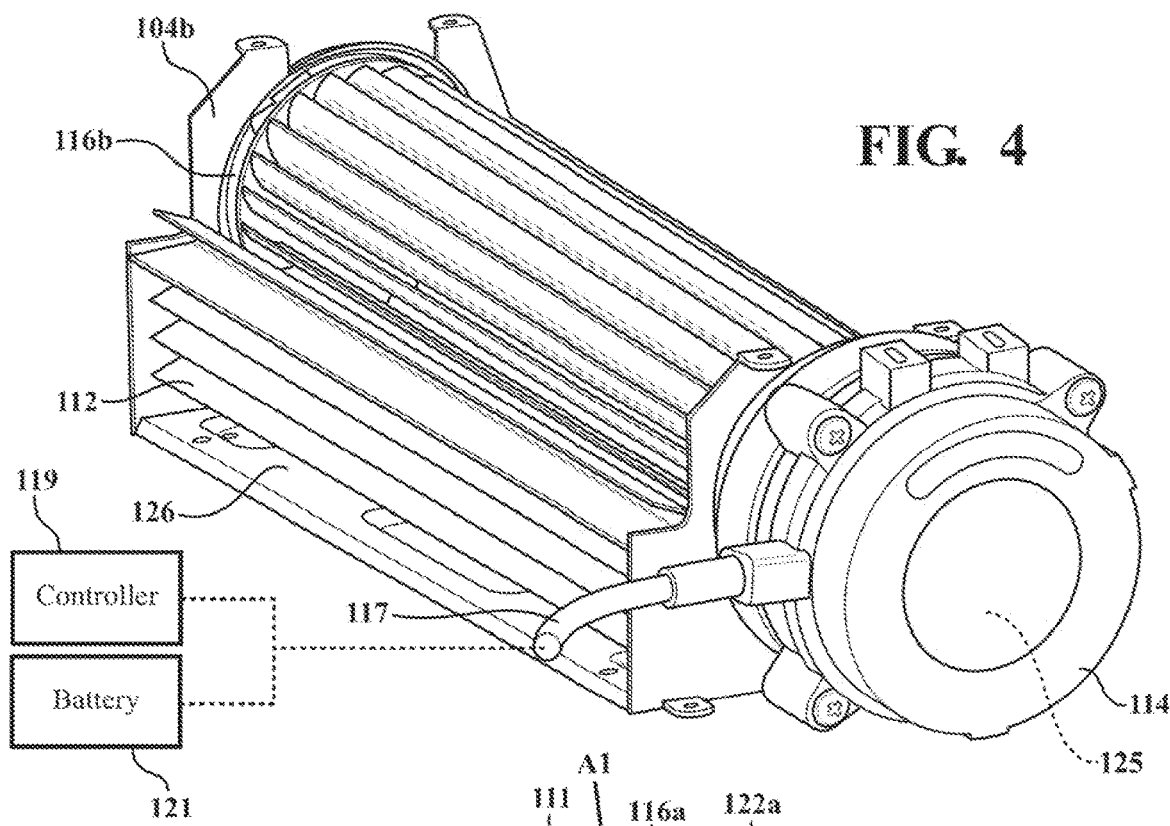
FIG. 4 is a perspective view of a portion of a drag reduction device in accordance with one exemplary embodiment that can be utilized in the transport vehicle of FIG. 1.

Referring now to FIGS. 2 and 3, one exemplary embodiment of a pair of drag reduction devices 100a, 100b coupled externally to the trailer unit 24 of the land vehicle 20 is provided. In particular, each one of the pair of land reduction devices 100a, 100b includes a fan assembly 110 contained within a respective housing 102.

Each housing 102 has an inner housing portion 103 which is respectively coupled to, and extend away from, an exterior surface 66 of a top portion 68 of the rear wall 56 adjacent to an edge 70 defining the intersection between the rear wall 56 and the top wall 52. Each housing 102 also includes a pair of opposing side housing portions 104a, 104b coupled to, and extending transverse from, the inner housing portion 103 and from a lower housing portion 126, with the lower housing portion 126 also coupled to, and extending transverse from, the inner housing portion 103. Still further, each housing 102 also includes an outer housing portion 105 coupled to, and extending transverse from, each of the side housing portions 104a, 104b and lower housing portion 126 and spaced from the inner housing portion 103. Further, the housing 102 also defines a first opening 111, or air intake opening 111, contained within a top edge 103a of the inner housing portion 103, a top edge 105b of the of the outer housing portion 105, and an opposing top portion of the pair of opposing side housing portions 104a, 104b. The housing 102 also defines a second opening 115, or air outlet opening 115, contained between the lower edge 105a of the outer housing portion 105 and the lower housing portion 126 (sometimes referred to hereinafter as lower surface 126) and between the pair of opposing side housing portions 104a, 104b. A mesh screen 130 may optionally be seated onto the surface of the top edge 103a of the inner housing portion 103, the top edge 105b of the of the outer housing portion 105, and the opposing top portion of the pair of opposing side housing portions 104a, 104b corresponding to the air intake opening 111 to partially cover the air intake opening 111 and protect the fan assembly 100 from debris entering as air is drawn into the air intake opening 111 when the land vehicle 20 is being driven.

Each of the fan assemblies 100a, 100b includes a plurality of fan blades 122 extending radially outwardly from a central rotatable shaft 120 defining an axis of rotation AR. A pair of opposing end cover members 116a, 116b may be coupled to the rotatable shaft 120 that are positioned respectively between and spaced from one of the pair of opposing side housing portions 104a, 104b. The pair of end cover members 116a, 116b provide the coupling points at either end for each of the fan blades 122. As illustrated in FIG. 3, a first end cover member 116a is positioned between a first side housing portion 104a and the fan blades 122, while a second end cover member 116b is positioned between and spaced from a second side housing portion 104b and the fan blades 122, in each of the drag reduction devices 100a, 100b. The shaft 120 is rotatably supported at either end by the opposing side housing portions 104a, 104b.

In general, the fan blades 122 are provided with a desired shape, extension length and pitch angle PA that are collectively configured to maximize the relative amount of air (shown by arrow A1 in one exemplary embodiment in FIG. 5) being drawn into the air input opening 111 during operation of the land vehicle 20 at the particular vehicle speed, with the air causing the fan blades 122, shaft 120 and end cover members 116a, 116b to rotate about the axis of rotation AR in a rotational direction (clockwise or counterclockwise about the axis of rotation AR) as the air (shown by arrow A2 in the one exemplary embodiment in FIG. 5) moves around and in the fan assembly 100 within the housing 102. In the embodiments shown below, the fan blades 122 are curved in shape, as will be described in detail below with respect to FIGS. 4-7. However, in other embodiments, the fan blades 122 may be flat (i.e., not curved).

As noted above, each of the fan blades 122 each have a known extension length, measured from an inner radial end 122c to an outer radial end 122d (see FIG. 6), and the same pitch angle PA. The pitch angle PA refers to the angular measurement between a normal line NL (i.e., a line extending normal to the outer surface of the shaft 120) and a tangent line TL (i.e., a line drawn from the inner radial end 122c and the outer radial end 122d of one fan blade 122).

The pitch angle PA can vary anywhere between and including 0 and 90 degrees, more preferably between 30 and 60 degrees. In alternative embodiments, as opposed to being the same pitch angle, the pitch angle PA of the fan blades 122 may be variable.

Each one of the land reduction devices 100a, 100b also includes one or more air foils 112 that are coupled to, and extend between, each of the pair of opposing side housing portions 104a, 104b. The one or more air foils 112 are spaced from the respective fan assembly 100a, 100b within the respective housing 102a, 102b and also extend at least partially within the second opening 115. The one or more air foils 112 function to redirect the flow of air exiting through the second opening 115 at a controlled outflow angle. The air foils 112 can be thin flat plates or can have a predefined outer profile, such as the curved outer profile shown below in the exemplary embodiments of FIGS. 3-13 and 16-17, as described below.

The number, relative positioning, and shape of the one or more air foils 112 contained within the housing 102, and working in conjunction with the shape and size of the housing 102, are collectively configured to redirect the air flow exiting out the air outlet opening 115 (shown by arrow A3 in the one exemplary embodiment in FIG. 3) at a controlled outflow angle during operation of the land vehicle 20 at the particular vehicle speed. In this regard, the number, relative positioning, and shape of the one or more air foils 112 works in conjunction with the fan blades 122 having the desired shape, extension length and pitch angle PA as described above to maximize air flow through the fan assembly 100 as the land vehicle 20 is driven at the particular vehicle speed (particularly a particular vehicle speed in a forward direction) to provide the a controlled outflow angle that maximizes the drag reduction of the land vehicle 20 at that particular vehicle speed.

Accordingly, as air flows into the air intake opening 111 and through the fan assembly 100a or 100b to the air outlet opening 115 (such as when the transport vehicle 20 is being driven), the fan blades 122, end cover members 116a, 116b, and shaft 120 rotate in coordination about the axis of rotation AR in response and relative to the stationary housing 102a, 102b. Further, the air exiting the housing 102a, 102b is redirected within the air outlet opening 115 to the controlled outflow angle upon exiting by the one or more air foils 112 partially contained within the air outlet opening 115.

As best illustrated in FIGS. 2 and 3, each of the drag reduction devices 100a, 100b optionally includes a motor housing 114 housing a motor (shown in phantom as 125 in FIG. 2) that is respectively coupled to a corresponding one of the rotatable shafts 120. The motor 125 is preferably an electric motor that is electrically coupled to a controller 119 and battery 121 via a connecting wire 117. The battery 121 is preferably solar charged and is a standalone battery utilized exclusively for the drag reduction device or devices 100, 100a, 110b, although in alternative embodiments could the same battery utilized to power the components of the cab unit 22 or trailer unit 24 of the transport vehicle 20 or could otherwise be electrically connected with a charger/alternator contained on the land vehicle 20. A bearing housing 133 houses a bearing 135 which rotatably supports the shaft 120 extending from the motor housing 114 to the stationary housing 102, 102a.

Accordingly, when actuated by the controller 119, the motor 125 can rotate the shaft 120 about the axis of rotation AR relative to the stationary housing 102a, 102b, which in turn also rotates the fan blades 122 and end cover members 116a, 116b in conjunction therewith. This motor 125 rotation can be utilized to adjust the rotational speed of the shaft 120 that naturally occurs due to air flowing through the fan assembly 100, 100a, 100b as the land vehicle is being driven at a particular speed so as to maintain the airflow flowing through the fan assembly 100, 100a, 100b in a manner to minimize the amount of drag on the land vehicle 20 (i.e., maximize drag reduction). In this regard, the controller 119 may be coupled to one or more sensors (not shown—(such as a speedometer on the land vehicle 20, a temperature gauge, one or more wind measurement gauges located on the cab unit 22 or trailer unit 24, etc.) in the land vehicle 20 that measures a particular vehicle parameter (such as vehicle speed, wind shear etc.), with the controller 119 including a processor (not shown) having an algorithm that determines the optimal rotational speed and rotational direction of the shaft 120 when the land vehicle is being driven at a particular speed and has particular measured vehicle parameters and directs the motor 125 to adjust the rotational speed and direction of rotational direction in response to maximize air flow through the fan assembly 100, 100a, 100b and maximize drag reduction.

Referring next to FIGS. 4-14, multiple exemplary embodiments are illustrated in which the design of one or more of the fan assembly 110; housing 102a, 102b; and/or the air foil 112 is varied on the exterior mounted drag reduction devices 100, 100a, 100b. Where appropriate, similar or corresponding portions or components of the drag reduction devices 100 in each of the exemplary embodiments of FIGS. 4-14, that have similar functions or purpose to corresponding portions or components of the drag reduction devices 100a, 100b of FIGS. 1 and 2, have been identified with like reference numerals (i.e. the fan blades are identified by reference numeral 122 in each of the embodiments), even where such portions or components have a slightly different shape, have been identified with like reference numerals, for ease of description.

Referring first to FIGS. 4-7, one exemplary embodiment of a portion of one of the pair of drag reduction devices 100 that could be utilized in the embodiment of FIGS. 1 and 2 is provided.

In the embodiment of FIGS. 4-7, the plurality of fan blades 122 are curved in shape, and thus include a convex first surface 122a and a concave second surface 122b.

In these embodiments, the convex first surface 122a is configured to receive air (shown by arrow A1) being drawn into the air input opening 111 during operation, with the air flowing through the fan blades 122, as the fan blades 122, shaft 120 and end cover members 116a, 116b rotate about the axis of rotation AR in a first rotational direction R1 (shown as clockwise in FIG. 4) as the air (shown by arrow A2) moves around and in the fan assembly 100 within the housing 102. The air then exits through the three air foils 112a, 112b, 112c and out the air outlet opening 115 (shown by arrow A3).

The curvature of the convex first surface 122a, and the corresponding opposing curvature of the concave second surface 122b, is designed in a manner that provides a maximum airflow (i.e., increase the draw of air A1 being drawn into the air input opening 111 and correspondingly increase the exit of air A3 out the air outlet opening 115 at a predetermined land vehicle 20 speed).

As also illustrated in FIGS. 4-7, the drag reduction device 100 include three air foils 112a, 112b, 112b having a similar outer profile and coupled in a stacked arrangement.

Figure 5:
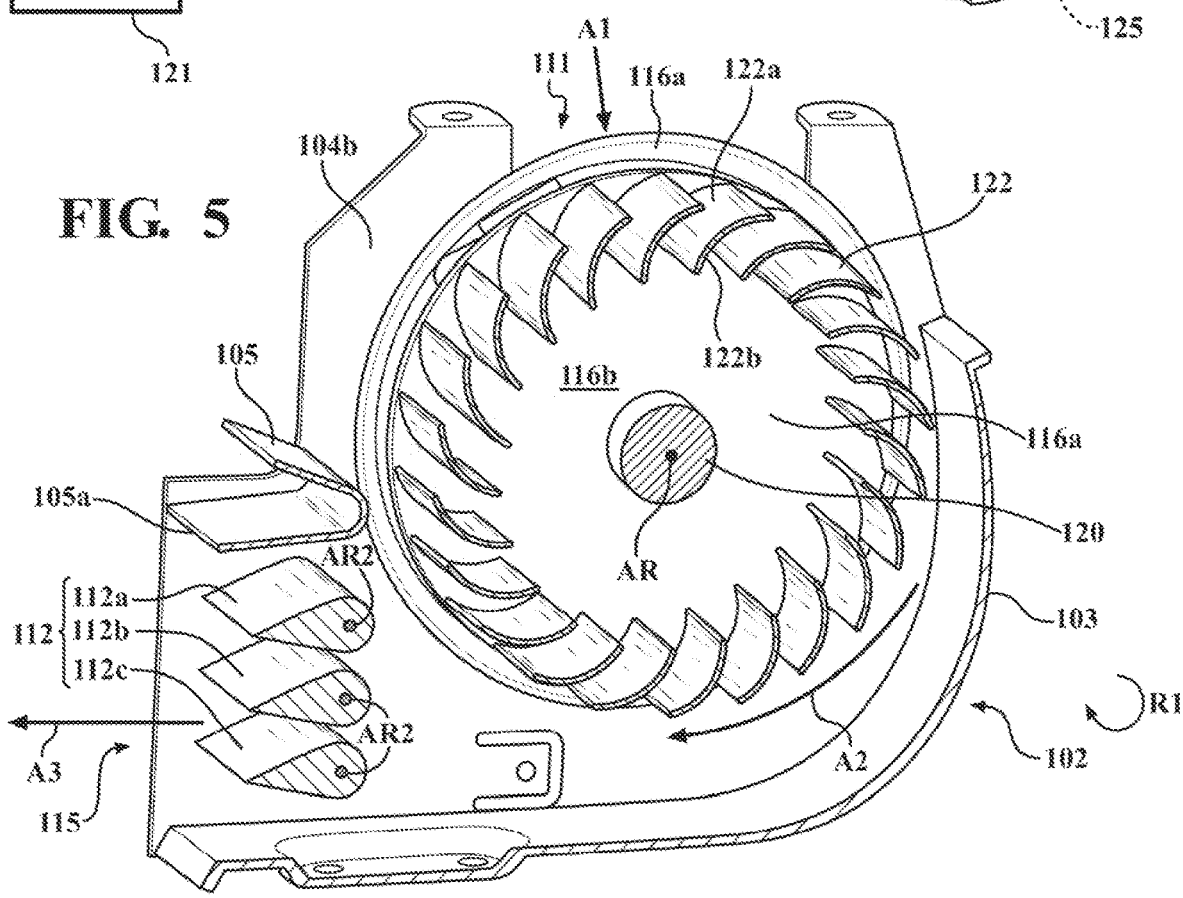
FIG. 5 is a section view of the portion of the drag reduction device of FIG. 4 including three air foils in a non-pivoted position and having the fan blades curved in a forward direction.
Figure 6:
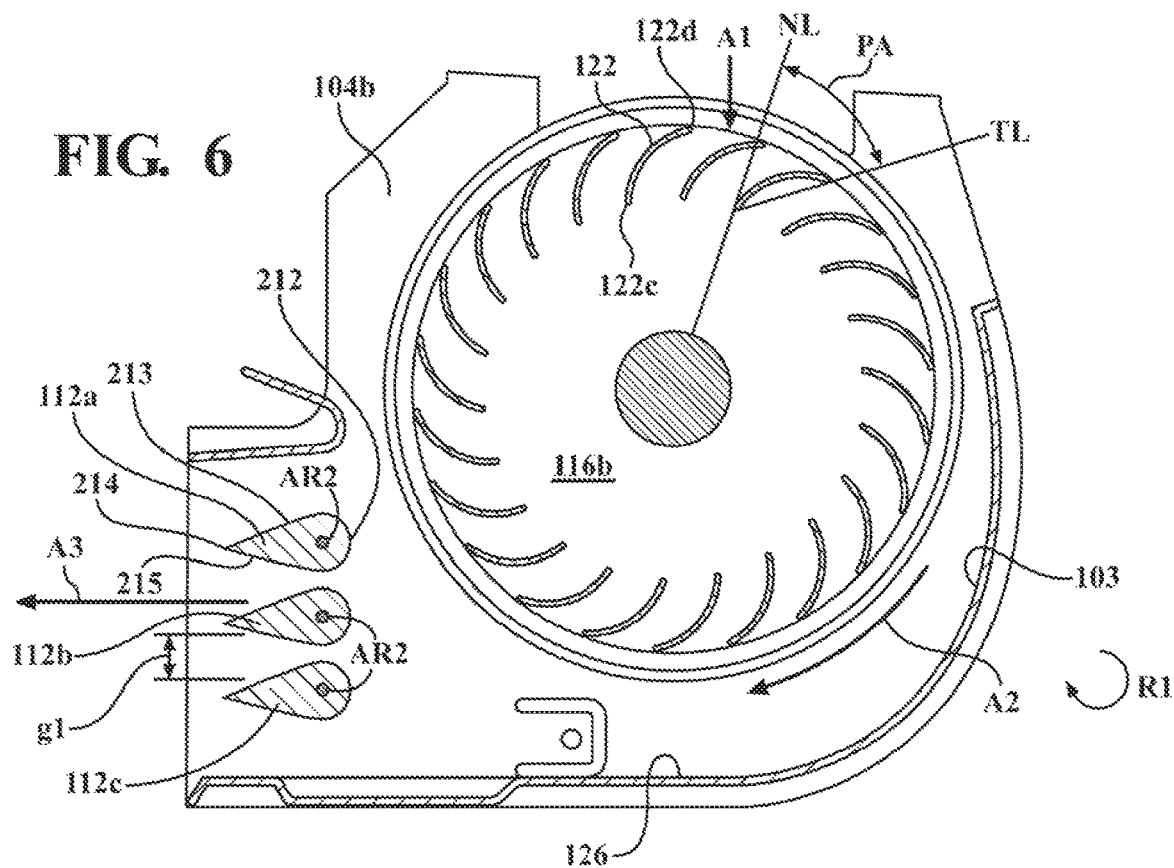
FIG. 6 is a front side view of FIG. 5.
Figure 7:
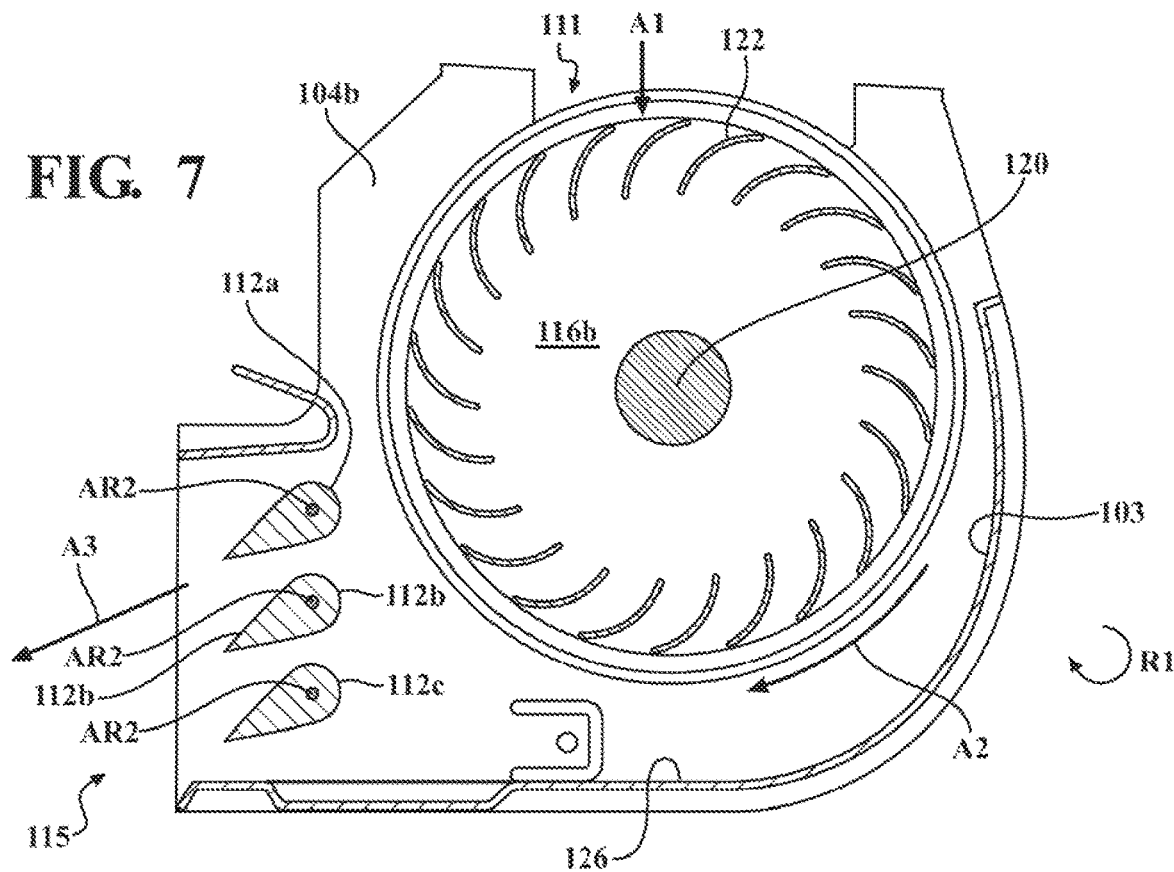
FIG. 7 is a front side view of FIG. 6 with the three air foils in a pivoted position.

As shown in FIGS. 5-7, the outer profile of each of the air foils 112a, 112b, 112b includes a curved inner surface 212 that serves to smoothly deflect the air flow A2 exiting from the fan blades 122. The curved inner surface 212 transitions into an upper surface 213 and lower surface 215 that are angled towards one another and collectively terminate into an outer termination edge 214. The upper surface 213 and lower surface 215 between an adjacent pair of the air foils 112a, 112b, 112c is separated by a gap g1 that is predefined (i.e., there is a predefined distance corresponding to the gap g1 between the respective air foils 112a and 112b, there is a predefined distance corresponding to the gap g1 between the respective air foils 112b and 112c).

The stacked arrangement, as illustrated in FIGS. 4-7, refers to an arrangement wherein distance between the curved inner surface 212 of each of the air foils 112a, 112b, 112b (as well as the outer termination edge 214) are equally spaced from the inner housing portion 103 (and are thus vertically stacked relative to one another as shown in FIGS. 3-6). In alternative embodiments (not shown), the distance may be unequally spaced.

In the embodiment of FIGS. 4-7, each of the air foils 112a, 112b, 112b is pivotally connected to the pair of opposing side housing portions 104a, 104b about pivoting points AR2. Further, while not shown, each of the air foils 112a, 112b, 112b may also connected to the controller 119, which controls the movement of the air foils 112a, 112b, 112b between a non-clocked position (FIG. 6) and a clocked position (FIG. 7), and any point in between. Depending upon the combination of vehicle parameters sensed by the sensors of the land vehicle 20 at a determined (such as temperature, wind shear etc.) and sent to the controller 119, the controller 119 can determine an optimum position of the air foils 112a, 112b, 112b to provide the least drag, and pivot the air foils to any position between and including the non-clocked position (FIG. 5) and the clocked position (FIG. 7) to provide the least drag on the land vehicle 20 at the particular vehicle speed.

Figure 8:
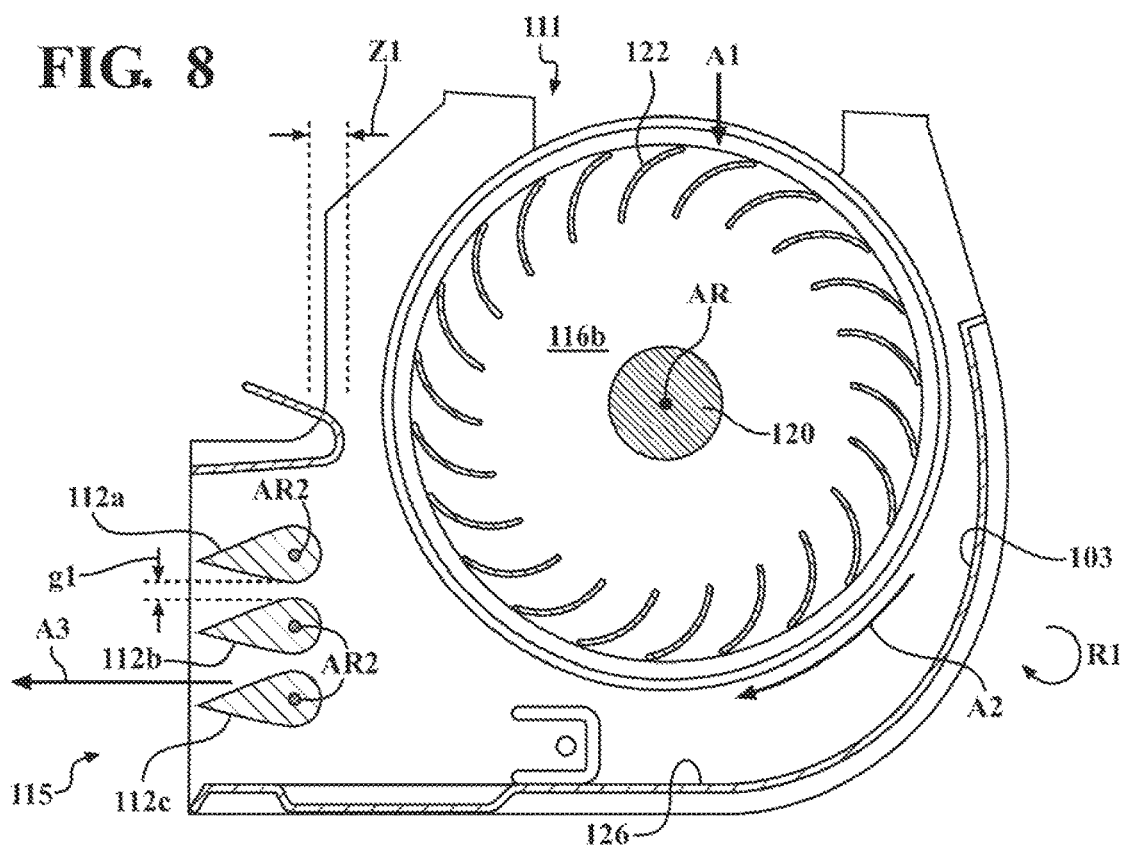
FIG. 8 is a front side view of the drag reduction device with the three air foils in a non-pivoted position in accordance with another exemplary embodiment with the three air foils are positioned a greater distance from the plurality of fan blades relative to the embodiment of FIGS. 4-7.

Referring now to FIG. 8, another alternative embodiment of the drag reduction devices 100 that could be utilized in the embodiment of FIGS. 1 and 2 is provided. In this embodiment, each of the air foils 112a, 112b, 112b are provided in the same stacked arrangement and with the same pivotal coupling as the embodiment of FIGS. 3-6, but wherein the spacing of each of the air foils 112a, 112b, 112b is spaced further from the inner housing portion 103 by an additional distance Z1. By virtue of this increased distance Z1, the air flow A3 extending through the gap g1 in the non clocked position and exiting through the air outlet 115 is slightly different than the air flow A3 in the embodiment of FIGS. 4-7 in the non-clocked position (as shown in FIG. 6). Accordingly, the associated drag of the land vehicle 20 in the embodiment of FIG. 8 at a given vehicle speed, under the same vehicle parameters as sensed by the sensors and sent to the controller 119, is slightly different than the embodiment of FIGS. 4-7, which may be desirable depending upon other parameters for the land vehicle 20 on which it is used.

Figure 9:
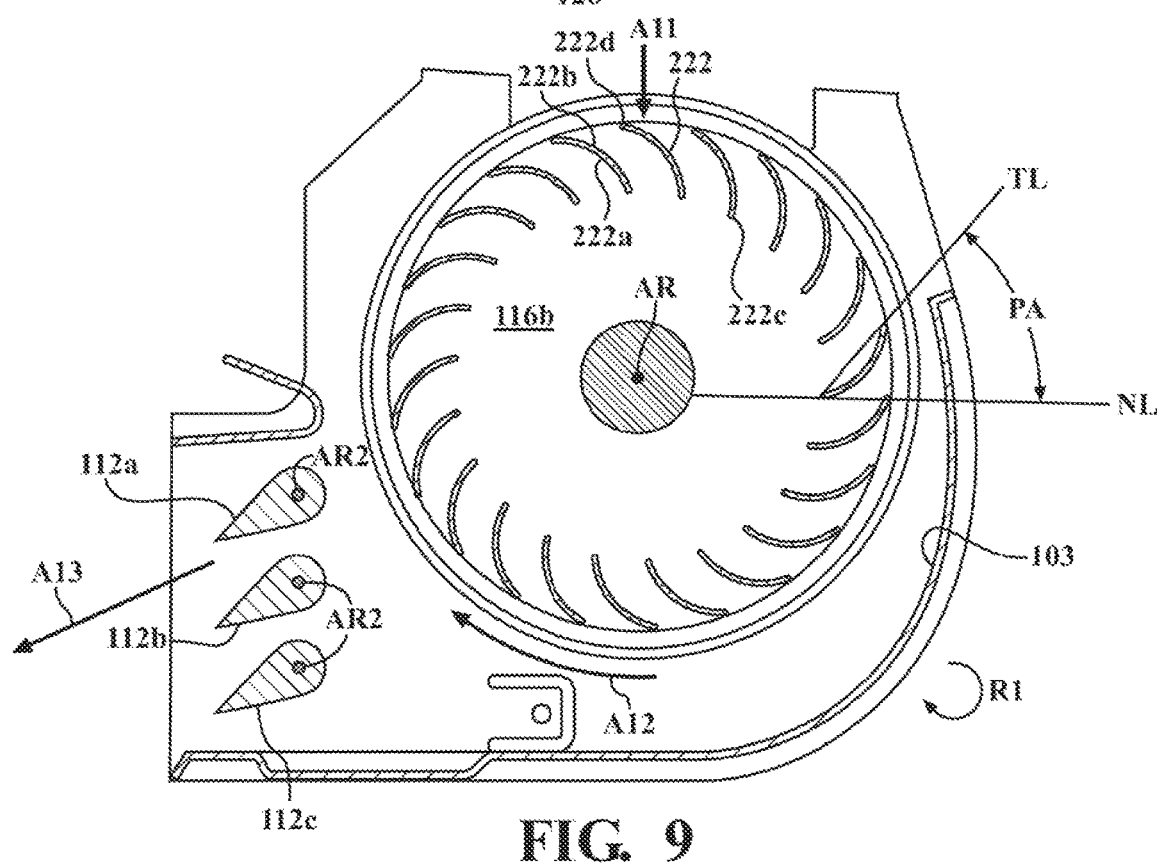
FIG. 9 is a front side view of the drag reduction device in accordance with another exemplary embodiment with three air foils in the pivoted position and with the curvature of the fan blades reversed from that in the exemplary embodiment of FIGS. 4-7.

Referring now to FIG. 9, another alternative embodiment of the drag reduction devices 100 that could be utilized in the embodiment of FIGS. 1-3 is provided. In this embodiment, the curvature of the fan blades 222 is the opposite of the curvature of the fan blades 122 in FIG. 3-6.

In particular, as shown in FIG. 9, the plurality of fan blades 222 also include a convex first surface 222a and a concave second surface 222b. However, in FIG. 9, the concave second surface 222b is configured to receive air (shown by arrow A11) being drawn into the air input opening 111 during operation, with the air flowing through the fan blades 222 as the fan blades 222, shaft 120 and end cover members 116a, 116b rotate about the axis of rotation AR in a first rotational direction R1 (shown as clockwise in FIG. 8) as the air (shown by arrow A12) moves around and in the fan assembly 100 within the housing 102. The air then exits through the three air foils 112a, 112b, 112c and out the air outlet opening 115 (shown by arrow A13).

In the embodiment shown in FIG. 9, and similar to the embodiments of FIGS. 3-6, each of the air foils 112a, 112b, 112b are provided in the same stacked arrangement and with the same pivotal coupling and with the same spacing as the embodiment of FIGS. 4-7. In the embodiment illustrated, the air foils 112a, 112b, 112b are provided in the clocked position, similar to the embodiment of FIG. 7 above, but are also moveable to the non-clocked position similar to FIG. 6 Accordingly, the amount of drag at a given vehicle speed and vehicle parameters may thus provide a different drag as compared to the land vehicle 20 including the fan assembly 100 as in FIGS. 4-7 by virtue of the altered fan blade configuration. Of course, in other alternative embodiments, the air foils 112a, 112b, 112b could also be spaced in a manner similar to that in FIG. 8 above.

Still other alternative embodiments of the drag reduction device 100 in accordance with subject disclosure are provided in FIGS. 10 and 11, in which the number of air foils 112 is different in number than the three air foils 112a, 112b, 112c as provided in FIGS. 4-7, but wherein the design of the fan assembly 100 is otherwise the same. In FIG. 10, a single air foil 112a is included, whereas in FIG. 11 two air foils 112a, 112b are included.

As also illustrated in FIG. 10, the positioning of the single air foil 112a is shown in a position not centered relative to the air outlet opening 115 between the lower surface 126 and the lower edge 105a of the outer housing portion 105, but in other embodiments may be centered relative to the air outlet opening 115 between the lower surface 126 and the lower edge 105a of the outer housing portion 105. As also illustrated in FIG. 11, the positioning of the pair of air foils 112a, 112b is shown in a position centered relative to the air outlet opening 115 between the lower surface 126 and the lower edge 105a of the outer housing portion 105.

Figure 12:
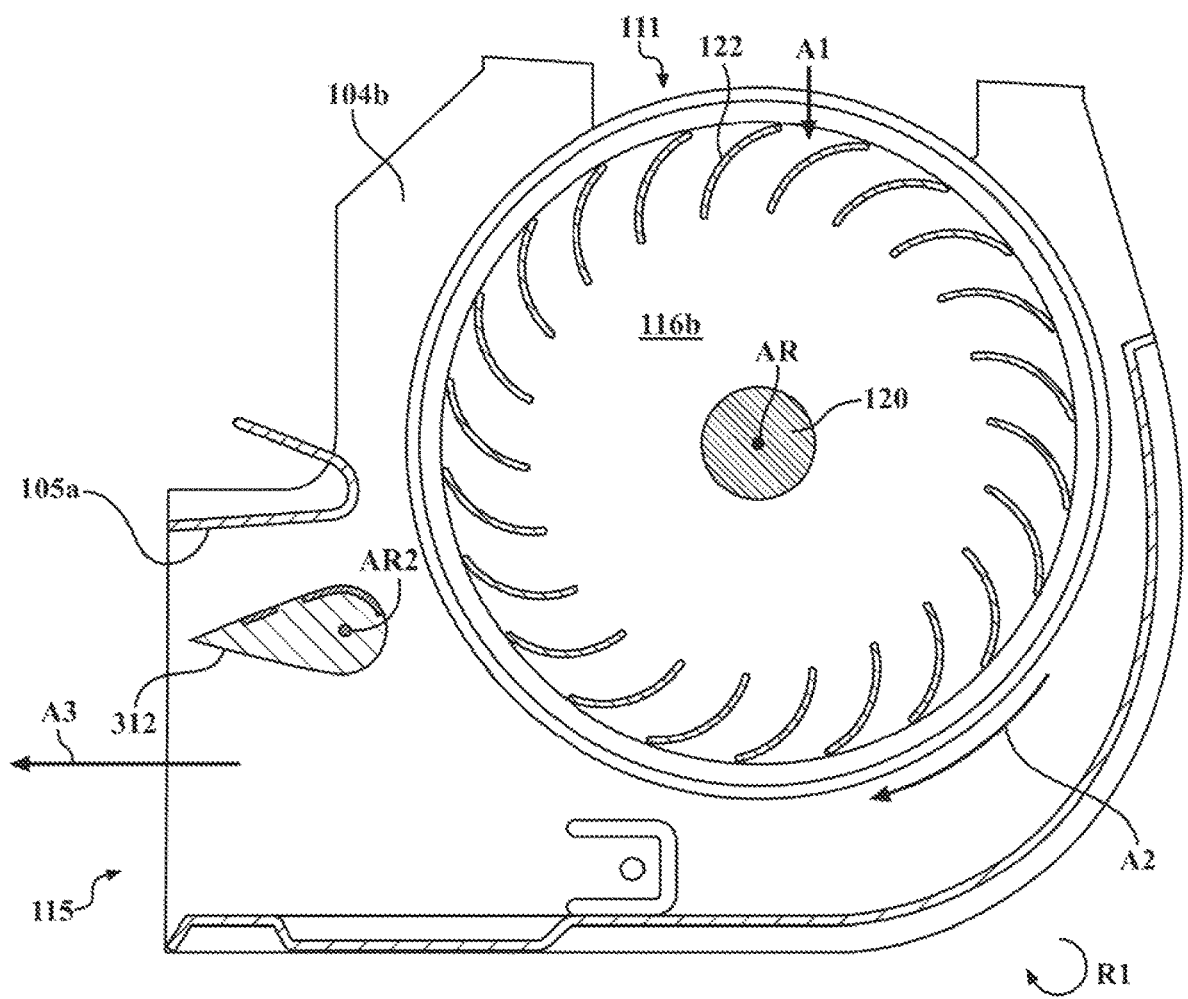
FIG. 12 a front side view of the drag reduction device in accordance with another exemplary embodiment with one plasma-controlled air foil in the non-pivoted position with the curvature of the fan blades corresponding to that in the exemplary embodiment of FIGS. 4-7.
Figure 13:
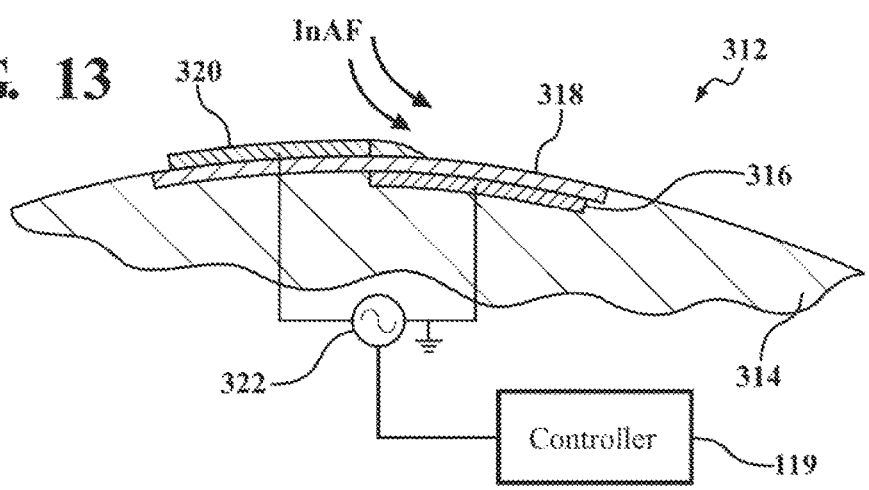
FIG. 13 is a closeup side view of a portion of the plasma-controlled air foil of FIG. 12.

Referring next to FIGS. 12 and 13, in yet another alternative embodiment of the drag reduction device 100, the one or more air foils (shown in FIGS. 12 and 13 as one air foil) is a plasma-controlled air foil 312. The plasma-controlled air foil 312 generates high voltage pulses along the outer surface of the respective air foil 312 that can generate plasma fields in proximity to the air foils 312 to alter the flow of air passing in close proximity thereto, which can further enhance the ability of the air foil 312 to control the outflow angle AR3 (see FIG. 13) that maximizes the drag reduction of the land vehicle 20.

The plasma-controlled air foil 312 includes a base substrate material 314 that corresponds to the material utilized to form the air foils 112 of FIGS. 4-11. The air foil 312 includes an embedded electrode 316 and a surface electrode 320 coupled to an AC voltage source 322 (or DC voltage source), which is electrically coupled to the controller 119. A dielectric material 318 is disposed between the embedded electrode 316 and surface electrode 320. In operation, as the fan blades 122 are rotating at the desired speed corresponding to the land vehicle speed and other vehicle operating parameters, the controller 119 can direct the AC voltage source 322 (or DC voltage source) to generate a high voltage pulse through each of the embedded electrode 316 and the surface electrode 320 on the surface of the air foil 312 and a plasma field is generated in proximity to the surface of the air foil 312. The plasma field acts on the air flowing in proximity to the air foil 312 to generate an induced air flow (InAF—see FIG. 13), which can further enhance the ability of the air foil 312 to control the outflow angle AR3 (see FIG. 13) that maximizes the drag reduction of the land vehicle 20.

Figure 14:
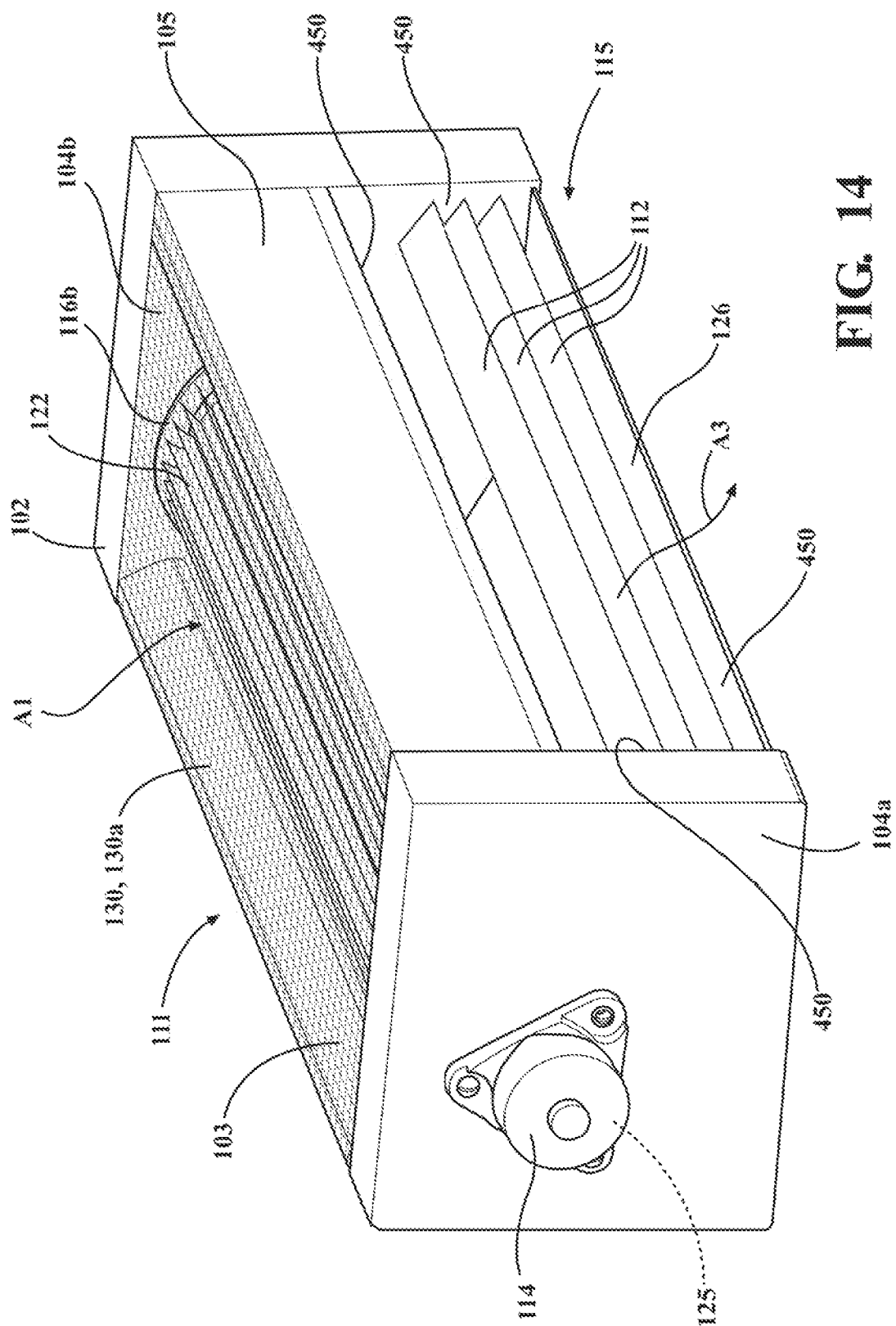
FIG. 14 is a perspective view of another drag reduction device having a fan assembly as in FIGS. 4-7 but also including a plasma actuated mesh screen and wherein the housing includes a negatively charged surface around the air outlet.

In yet another alternative embodiment of the drag reduction device 100, as illustrated in FIG. 14, the mesh screen 130 is a plasma actuated mesh screen 130a that provides a positive charge for the air flow A1 that is entering through the air inlet opening 111 while still assisting in the prevention of FOD ("Foreign Object Damage") ejection during operation of the land vehicle 20. To provide the plasma actuation, the mesh screen 130 is electrically connected to a positive electrode via a wire (not shown) and may also be connected to the controller 119 to generate a plasma field in proximity to the mesh screen 130.

Still further, the surfaces 450 of the housing 102 that defines the air outlet opening 115, and/or the lower surface 126 of the housing 102, and including optionally portions of the one or more air foils 102, would be negatively charged in a manner similar to the charge created on the air foil 312 in FIG. 13 (i.e., wherein an embedded electrode and a surface electrode similar to the embedded electrode 316 and a surface electrode 320 of FIG. 13 are coupled to an AC voltage source (or DC voltage source) which is electrically coupled to the controller 119) and thus generates an induced air flow InAF within the air flow A3 exiting through the air outlet opening 115. In alternative embodiments (not shown), these surfaces could be positively charged.

In the design of FIG. 14, the design of the housing 102, fan blades 122 and/or the air foils 112 and motor 125 may be as described in any one of the embodiments of FIGS. 4-13.

Figure 15:
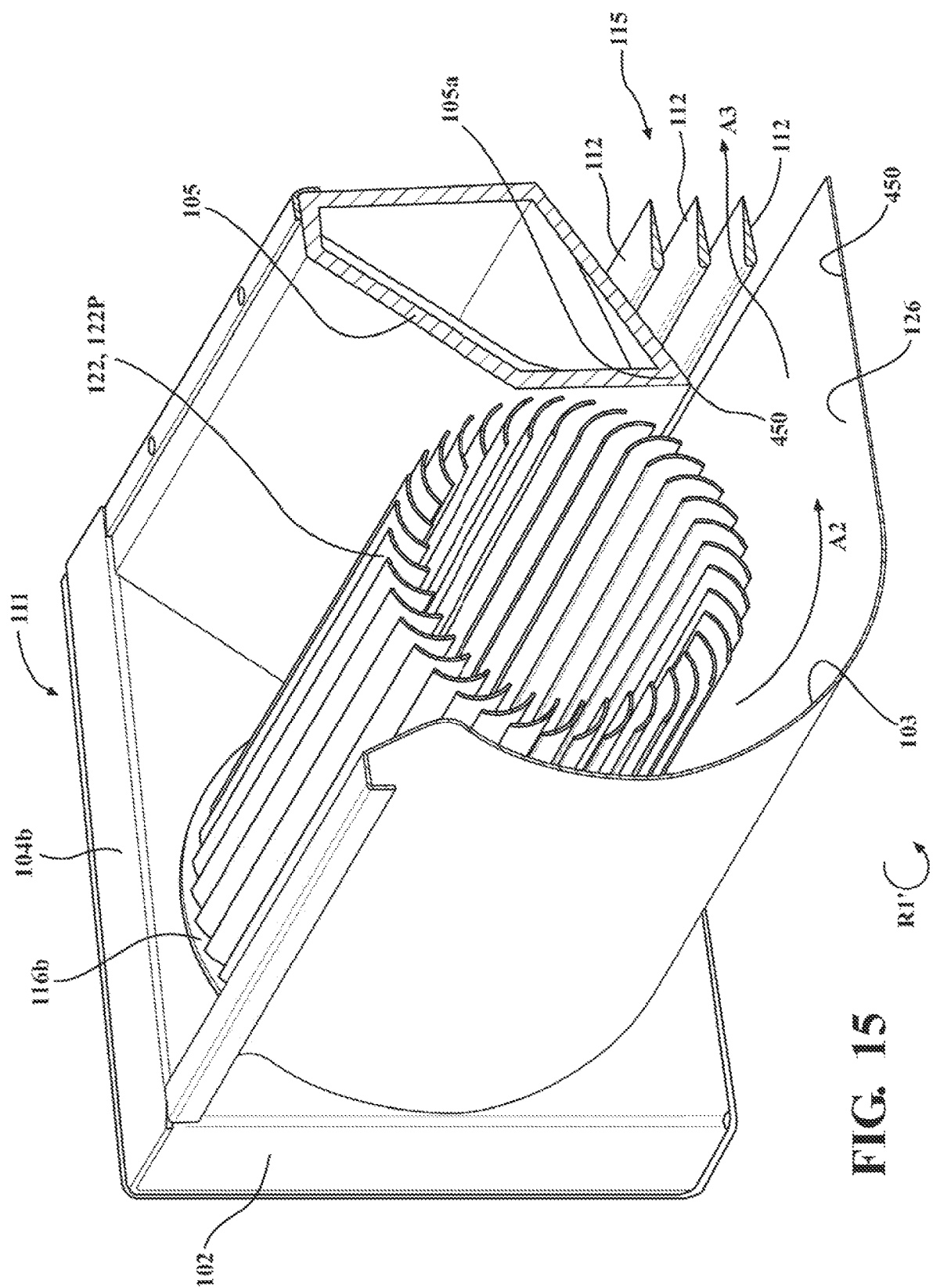
FIG. 15 is a partial perspective view of another drag reduction device having a fan assembly as in FIGS. 4-7 but in which the plurality of fan blades are plasma-controlled fan blades and wherein the housing includes a negatively charged surface around the air outlet

In yet another alternative embodiment of the drag reduction device 100, as illustrated in FIG. 15, the fan blades 122 are a plasma actuated fan blades 122P that generate plasma fields in proximity to the fan blades 122 and thus provides a positive charge for the air flow A1 that is entering through the air inlet opening 111 and to the air flow A2 that is progressing around the shaft 120. Non limiting examples of providing the positive charge include a slip ring (not shown) coupled to the fan blades 122 or wherein the bearing coupled to shaft is provided with the positive charge. Still further, the surfaces 450 of the housing 102 that defines the air outlet opening 115, and/or the lower surface 126 of the housing 102, including optionally portions of the one or more air foils 102, would be negatively charged in a manner similar to the charge created on the air foil 312 in FIG. 13 and as described above with respect to FIG. 14, and thus generates an induced air flow InAF within the air flow A3 exiting through the air outlet opening 115. In alternative embodiments (not shown), these surfaces could be positively charged.

Figure 16:
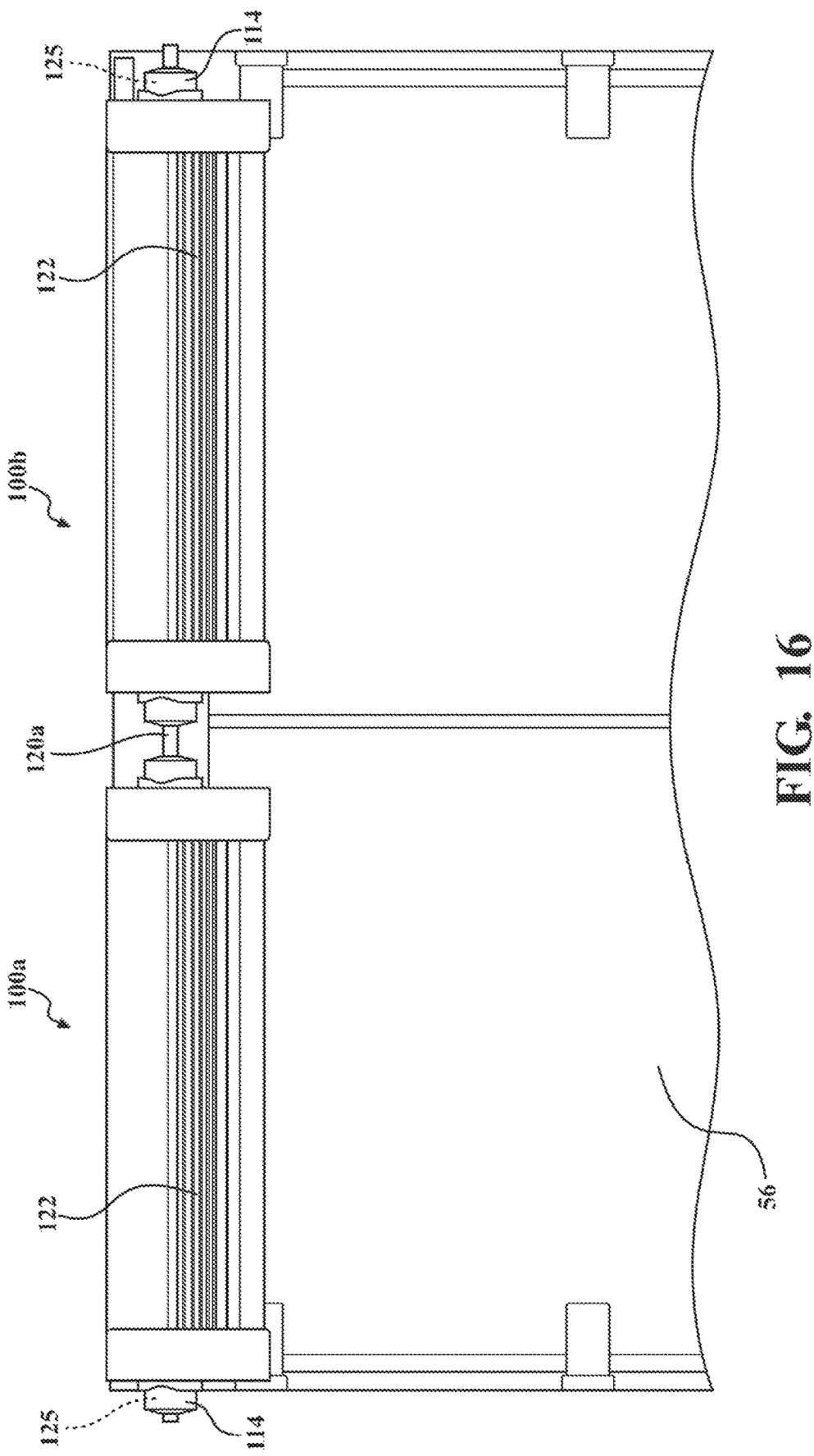
FIG. 16 is a rear perspective view of a portion of the drag reduction device of FIG. 1 having two drag reduction devices in accordance with another exemplary embodiment, with the two drag reduction devices having a common rotatable shaft.

Referring next to FIG. 16, another exemplary embodiment of a pair of drag reduction devices 100a, 100b is provided, in which a single rotating shaft 120A is utilized to couple together the pair of drag reduction devices 100a, 100b and allow simultaneous rotation of the distinct pair of fan blades 122, as opposed to individual rotating shafts 120 associated with each of the pair of drag reduction devices 100a, 100b in the embodiments illustrated in FIGS. 2-14. A motor housing 114 housing the motor 125 may be included and may be coupled to the single rotating shaft 120A at one end, or at both ends (as shown in FIG. 16).

Figure 18:
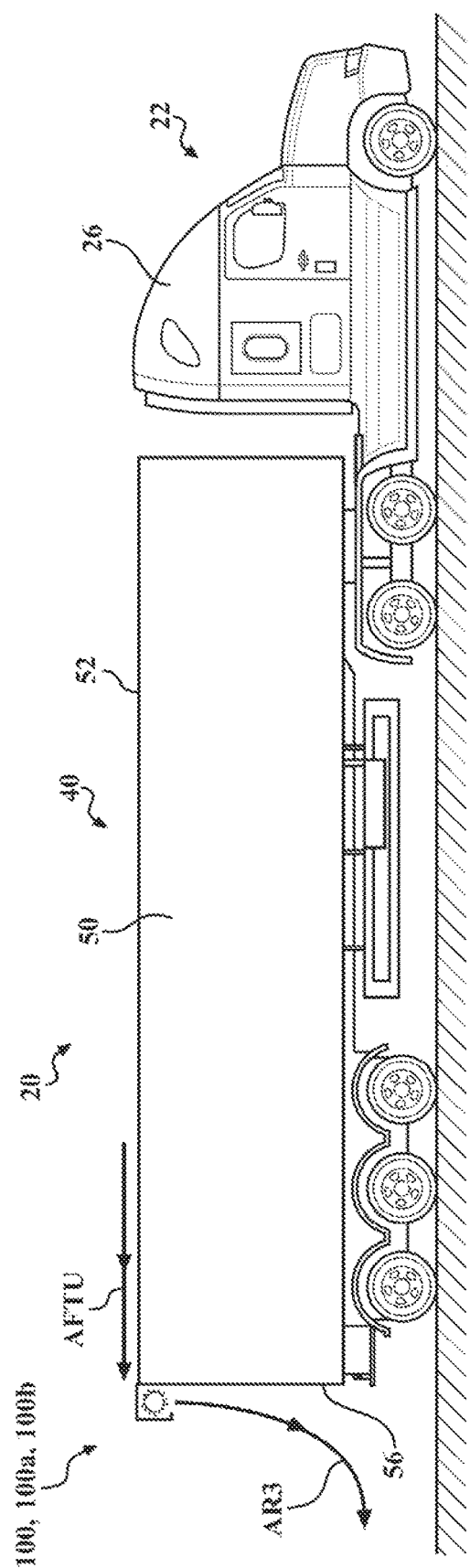
FIG. 18 is a side perspective view of the transport device with drag reduction devices in accordance with any one of the exemplary embodiments of FIGS. 1-15 and including arrows representing air flow when the representative transport device is moving in a forward direction.

In any of the embodiments described above in FIGS. 1-16, the inclusion of the one or more drag reduction devices 100, 100a, 100b coupled to the exterior of the trailer unit 24 of the land vehicle 20 (represented generically by FIG. 18) provided reduced drag as compared with a land vehicle 20 including the same cab unit 22 and trailer unit 24 but without the drag reduction devices at the same vehicle speed and operating conditions.

Figure 17:
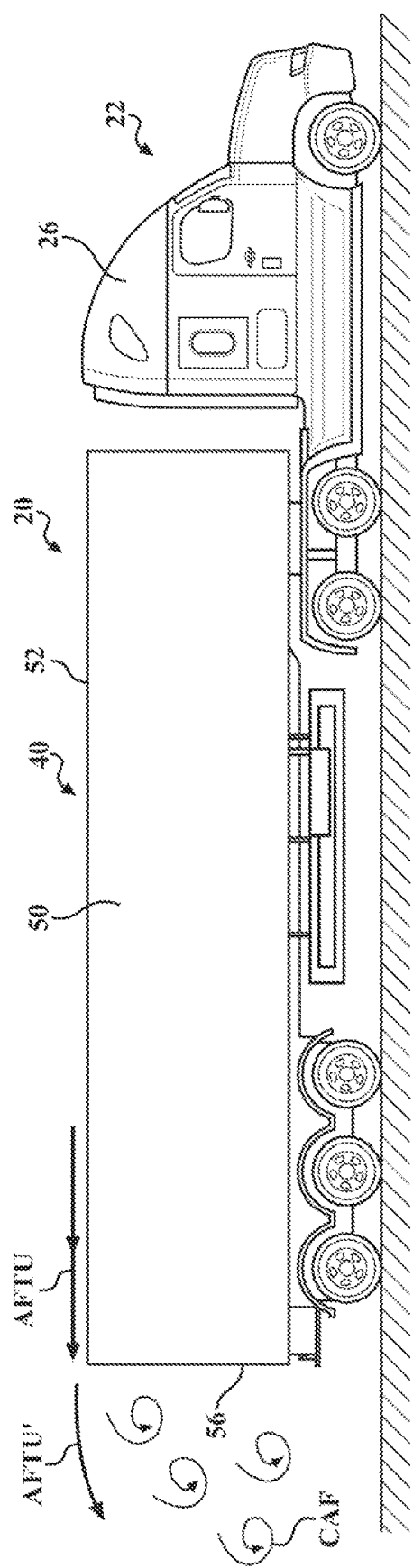
FIG. 17 is a side perspective view of the transport device without drag reduction devices and including arrows representing air flow when the transport device is moving in a forward direction.

As shown in FIG. 17, air flowing over the top of the trailer unit 24 (represented by arrow AFTU) simply continues to flow beyond the end of the trailer unit 24 (represented by arrow AFTU') with a portion of the air flowing in circular swirls (represented by arrows CAF). The presence of the circular swirls CAF adds drag to the land vehicle 20, resulting in lower fuel economy, increased battery usage or energy usage, and higher emissions associated with increased fuel usage. However, when the one or more drag reduction devices 100, 100a, 100b, the air exiting the one or more drag reduction devices 100, 100a, 100b flows along air flow path AR3, thus reducing resistance from air friction and pressure friction, and thereby contribute significantly to reduced fuel or other energy consumption as the land vehicle 20 is being driven along a surface during normal use.

Referring next to FIGS. 19 and 20, yet another alternative embodiment of the drag reduction device 100 are provided. In FIGS. 19 and 20, a pair of drag reduction devices 100a, 100b are included internally within a portion of the trailer unit 24 itself, with internal cavities 500a, 500b created within the trailer unit 24 near the intersection of the top wall 52 and rear wall 56 to house each respective one of the fan assemblies 110a, 110b.

In particular, the top wall 52 and rear wall 56 each have a pair of cut out portions 411a, 411b and 415a, 415b that define a pair of cavities 500a, 500b therebetween that each house a respective one of the fan assemblies 110a, 110b.

The top wall 52 may further be defined as including a left, central and right side lateral extension 52A, 52B and 52C, a border extension 52D that defines the edge portion of the top wall 52 and the rear wall 56, and a cab extending portion 56E, and a lower stepped portion 52F. Similarly, the rear wall 56 may further be defined as including a left, central and right side lateral extension 56A, 56B and 56C, a border extension 56D that defines the edge portion to the border extension 52D of the top wall 52, a downward extending portion 56E, and an inward stepped portion 56F.

The cutout portion 411a is defined as the opening between the cab extending portion 52E, the left side lateral extension 52A, the border extension 52D, and the center lateral extension 52C. Similarly, the cutout portion 411b is defined as the opening between the cab extending portion 56E, the right side lateral extension 52C, the border extension 52D, and the center lateral extension 52C. The cutout portion 415a, which is open to the cutout portion 411a, is defined as the opening between the downward extending portion 56E, the left side lateral extension 56A, the border extension 56D, and the center lateral extension 56C. Similarly, the cutout portion 415b, which is open to the cutout portion 411a, is defined as the opening between the downward extending portion 56E, the right side lateral extension 56C, the border extension 56D, and the center lateral extension 56C.

The cavity portion 500a is the further defined as the area between the cutout portion 411a, the lower stepped portion 52F, the inward stepped portion 56F, the border extension 52D, the border extension 56D, and the cutout portion 415a. Similarly, the cavity portion 500b is the further defined as the area between the cutout portion 411b, the lower stepped portion 52F, the inward stepped portion 56F, the border extension 52D, the border extension 56D and the cutout portion 415b.

The fan assemblies 100a, 100b, as noted above, are each positioned within the respective cavities 500a, 500b.

In particular the fan assembly 100a is positioned within the first cavity 500a such that the inner housing portion 103 is adjacent to and supported by the inward stepped portion 56F, with the lower portion 26 positioned adjacent to the lower stepped portion 52F, and with the outer housing portion 105 positioned inwardly from the border extensions 52D, 56D. The first opening 111 is aligned with the cutout portion 411a, and the second opening 115 is aligned with the cutout portion 415a. The motor housing 114 is coupled the cavity created between the left side lateral extension 52A, the left side lateral extension 56A, and the left side wall 50. Of course, in alternative embodiments, the motor housing 114 and motor 125 of one or both respective fan assembly 100a or 100b may be placed between the respective fan assemblies 100a, 110b.

In particular the fan assembly 100a is positioned within the first cavity 500a such that the inner housing portion 103 is adjacent to and supported by the inward stepped portion 56F, with the lower portion 26 positioned adjacent to the lower stepped portion 52F, and with the outer housing portion 105 positioned inwardly from the border extensions 52D, 56D. The first opening 111 is aligned with the cutout portion 411a, and the second opening 115 is aligned with the cutout portion 415a. The motor housing 114 is coupled the cavity created between the left side lateral extension 52A, the left side lateral extension 56A, and the left side wall 50.

Similarly, the fan assembly 100b is positioned within the second cavity 500b such that the inner housing portion 103 is adjacent to and supported by the inward stepped portion 56F, with the lower portion 26 positioned adjacent to the lower stepped portion 52F, and with the outer housing portion 105 positioned inwardly from the border extensions 52D, 56D. The first opening 111 is aligned with the cutout portion 411a of the top wall 52 (and hence the top wall 52 partially defines the first opening 111), and the second opening 115 is aligned with the cutout portion 415a of the rear wall 56 (and hence the rear wall 52 partially defines the second opening 115). The motor housing 114 is coupled the cavity created between the right side lateral extension 52B, the left side lateral extension 56B, and the right side wall 50. Of course, in alternative embodiments, the motor housing 114 and motor 125 of one or both respective fan assembly 100a or 100b may be placed outwardly of the respective fan assemblies 100a, 110b.

Similar to the embodiments wherein the fan assembly is coupled externally, air is drawn into the fan assembly 100a, 100b as the land vehicle 20 is traveling along a surface. The air flow A1 enters through the air inlet opening 111 contained within the cutout portion 411a, 411b, the air then flows around and in the fan blades 122 (see air flow A2) and then is propelled between the air foils 112 (shown as five air foils 112 in FIG. 20) and out the air outlet opening 115 (see air flow A3) contained within the cutout portion 415a, 415b. In the embodiment illustrated, the rotatable shaft 120, fan blades 122, and end portions 116a, 116b rotate in a counterclockwise direction R1' in response to air flow A1, A2, and A3 flows through the fan assemblies 100a, 100b about the axis of rotation AR (of course in alternative embodiments the rotation may be in a clockwise direction).

While the exemplary embodiment in FIGS. 19 and 20 shows one particular configuration of fan blades 122 and air foils 112, the subject disclosure contemplates any of the fan blade 122 and air foil 112 as provided in the drag reduction devices 100a, 100b coupled to an exterior of the trailer unit 24 as described above with respect to FIGS. 1-15. In addition, while FIGS. 19 and 20 show a configuration with rotatable shafts 120 each having separate rotatable shafts 120, it is also contemplated that a single rotatable shaft 120 can interconnect two sets of fan blades 112 such as in FIG. 16 above. Still further, the air foils 112 and/or the fan blades can also be plasma actuated in a manner similar to the embodiments described in FIGS. 14 and 15 above.

While the present disclosure and drawings are described in the context of semi- or tractor-trailer-type trucks, it should be appreciated that the presently disclosed devices and systems may be applicable to any moving vehicle, ranging from passenger cars, including SUVs and sedans and buses, to freight trains or locomotives. Moreover, the presently disclosed devices and systems may be applicable to any type of cargo trucks, including RV's, box-type trucks, delivery vans, or the like. Accordingly, as provided herein, the term "land vehicle" as provided herein is specifically intended to encompass moving vehicles and cargo trucks. Further, in embodiments such as passenger cars or SUV's that do not specifically include a distinct cab unit and a trailer unit as described above, the rearward portion of such passenger cars or SUV's can be further defined as the "trailer unit" for the purposes of the present invention.

While the invention has been described with reference to the examples above, it will be understood by those skilled in the art that various changes may be made, and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all examples falling within the scope of the appended claims.

Any reference to claim elements in the singular, for example, using the articles "a," "an," "the" or "said," is not to be construed as limiting the element to the singular. It will be further appreciated that the terms "include," "includes," and "including" have the same meaning as the terms "comprise," "comprises," and "comprising."

The invention claimed is:

1. A land vehicle comprising:
   a trailer unit comprising one or more walls having an exterior surface; and
   one or more drag reduction devices coupled to said exterior surface of said trailer unit with said one or more drag reduction devices configured to adjust air movement over and around the trailer unit as the land vehicle is driven on a surface at a particular vehicle speed, each one of said drag reduction devices comprising:
      a housing having an inner housing portion coupled adjacent to said exterior surface and a pair of side housing portions extending from said inner housing portion, said housing defining a first opening and a second opening; and
      a fan assembly contained within said housing, said fan assembly comprising:
         a central rotatable shaft rotatable around an axis of rotation;
         a plurality of fan blades coupled to and extending radially outwardly from said central rotatable shaft;
         a plurality of air foils pivotally coupled to each of said pair of side housing portions and positioned within said second opening, each one of said plurality of air foils configured to be movable to any position between and including a non-clocked position and a clocked position; and
      a controller coupled to said central rotatable shaft or to said one or more air foils, or to both said central rotatable shaft and said one or more air foils, and configured for controlling air flow through the fan assembly to maximize drag efficiency at the particular vehicle speed,
   wherein each one of said plurality of air foils includes:
      a curved inner surface positioned adjacent to and spaced from said plurality of fan blades;
      an upper surface transitioning from one end of said curved inner surface and a lower surface transitioning from an opposing end of said curved inner surface, with said upper surface and lower surface collective terminating into an outer termination edge, and
   wherein an upper surface of one of said plurality of foils is spaced from an upper surface of an adjacent one of said plurality of air foils by a gap.

2. The land vehicle according to claim 1 further comprising a motor coupled to said central rotatable shaft, wherein said controller is coupled to said motor and is configured to actuate said motor to control the rotation of said central rotatable shaft about said axis of rotation to maximize drag efficiency at the particular vehicle speed.

3. The land vehicle according to claim 1, wherein said controller is coupled to said one or more air foils with said controller configured for pivoting each of said one or more air foils to any position between and including a non-clocked position and a clocked position to redirect the flow of air exiting through the second opening to maximize drag efficiency at the particular vehicle speed.

4. The land vehicle according to claim 2, wherein said controller is coupled to said one or more air foils with said controller configured for pivoting each of said one or more air foils to any position between and including a non-clocked position and a clocked position to redirect the flow of air exiting through the second opening to maximize drag efficiency at the particular vehicle speed.

5. The land vehicle according to claim 1, wherein each of said plurality of fan blades are curved in shape and include a convex first surface and a concave second surface, with said convex first surface of each of said plurality of fan blades receiving air drawn through said first opening at the particular vehicle speed to rotate the central rotatable shaft about said axis of rotation.

6. The land vehicle according to claim 1, wherein said gap between each adjacent pair of said plurality of air foils is equal such that each adjacent pair of said air foils are equally spaced relative to each other adjacent pair of said air foils.

7. The land vehicle according to claim 1, wherein said gap between each adjacent pair of said plurality of air foils is unequal such that each adjacent pair of said air foils are unequally spaced relative to each other adjacent pair of said air foils.

8. The land vehicle according to claim 1, wherein said one or more air foils comprises a single air foil not centered relative to second opening.

9. The land vehicle according to claim 1, wherein said one or more air foils comprise one or more plasma-controlled air foils, each one of said one or more plasma-controlled air foils comprising:
   a base substrate material;

an embedded electrode coupled to said base substrate material and electrically coupled to a DC or AC voltage source, with said DC or AC voltage source electrically coupled to said controller;

a surface electrode coupled to said base substrate material and electrically coupled to said DC or AC voltage source;

wherein said controller directs said DC or AC voltage source to generate a high voltage pulse through each of said embedded electrode and said surface electrode to generate a plasma field in proximity to a surface of said one or more plasma-controlled air foils.

10. The land vehicle according to claim 1, wherein said fan assembly further comprises a mesh screen coupled over said first opening.

11. The land vehicle according to claim 10, wherein said mesh screen comprises a plasma actuated mesh screen that is electrically coupled a DC or AC voltage source, with said DC or AC voltage source electrically coupled to said controller, wherein said controller directs said DC or AC voltage source to generate a high voltage pulse through said plasma actuated mesh screen to generate a plasma field in proximity to a said plasma actuated mesh screen.

12. A land vehicle comprising:

a trailer unit comprising a top wall and a rear wall, with said top wall and said rear wall each having a cut out portion defining a cavity; and one or more drag reduction devices housed within said cavity with said one or more drag reduction devices configured to adjust air movement over and around the trailer unit as the land vehicle is driven on a surface at a particular vehicle speed, each one of said drag reduction devices comprising:

a housing having an inner housing portion coupled adjacent to said rear wall and a pair of side housing portions extending from said inner housing portion, said housing defining a first opening aligned with said top wall and a second opening aligned with said rear wall; and a fan assembly contained within said housing, said fan assembly comprising:

a central rotatable shaft rotatable around an axis of rotation;

a plurality of fan blades coupled to and extending radially outwardly from said central rotatable shaft;

a plurality of air foils pivotally coupled to each of said pair of side housing portions and positioned within said second opening, each one of said plurality of air foils configured to be movable to any position between and including a non-clocked position and a clocked position, wherein an upper surface of one of said plurality of foils is spaced from an upper surface of an adjacent one of said plurality of air foils by a gap, wherein said gap between each adjacent pair of said plurality of air foils is equal or unequal such that each adjacent pair of said air foils are equally spaced or unequally spaced relative to each other adjacent pair of said air foils; and a controller coupled to said central rotatable shaft or to said one or more air foils, or to both said central rotatable shaft and said one or more air foils, and configured for controlling air flow through the fan assembly to maximize drag efficiency at the particular vehicle speed.

13. The land vehicle according to claim 12 further comprising a motor coupled to said central rotatable shaft, wherein said controller is coupled to said motor and is configured to actuate said motor to control the rotation of said central rotatable shaft about said axis of rotation to maximize drag efficiency at the particular vehicle speed.

14. The land vehicle according to claim 12, wherein said controller is coupled to said one or more air foils with said controller configured for pivoting each of said one or more air foils to any position between and including a non-clocked position and a clocked position to redirect the flow of air exiting through the second opening to maximize drag efficiency at the particular vehicle speed.

15. The land vehicle according to claim 12, wherein each one of said one or more air foils includes:

a curved inner surface positioned adjacent to and spaced from said plurality of fan blades;

an upper surface transitioning from one end of said curved inner surface and a lower surface transitioning from an opposing end of said curved inner surface, with said upper surface and lower surface collective terminating into an outer termination edge.

16. The land vehicle according to claim 12, wherein said plurality of air foils comprise a plurality plasma-controlled air foils, each one of said plurality of plasma-controlled air foils comprising:

a base substrate material;

an embedded electrode coupled to said base substrate material and electrically coupled to a DC or AC voltage source, with said DC or AC voltage source electrically coupled to said controller;

a surface electrode coupled to said base substrate material and electrically coupled to said DC or AC voltage source;

wherein said controller directs said DC or AC voltage source to generate a high voltage pulse through each of said embedded electrode and said surface electrode to generate a plasma field in proximity to a surface of said plurality of plasma-controlled air foils.

17. A drag reduction device for use adjusting air over and around a land vehicle as the land vehicle is driven on a surface, said drag reduction device comprising:

a housing having an inner housing portion coupled adjacent to an exterior surface and a pair of side housing portions extending from said inner housing portion, said housing defining a first opening and a second opening; and a fan assembly contained within said housing, said fan assembly comprising:

a central rotatable shaft rotatable around an axis of rotation;

a plurality of fan blades coupled to and extending radially outwardly from said central rotatable shaft;

a plurality of air foils pivotally coupled to each of said pair of side housing portions and positioned within said second opening, each one of said plurality of air foils configured to be movable to any position between and including a non-clocked position and a clocked position; and a controller coupled to said central rotatable shaft or to said one or more air foils, or to both said central rotatable shaft and said plurality of air foils to adjust air movement through the fan assembly to maximize drag efficiency at the particular vehicle speed, wherein each one of said plurality of air foils includes:

a curved inner surface positioned adjacent to and spaced from said plurality of fan blades;

an upper surface transitioning from one end of said curved inner surface and a lower surface transitioning from an opposing end of said curved inner surface, with said upper surface and lower surface collective terminating into an outer termination edge, and wherein an upper surface of one of said plurality of foils is spaced from an upper surface of an adjacent one of said plurality of air foils by a gap.

18. The drag reduction device of claim 17 further comprising a motor coupled to said central rotatable shaft,
wherein said controller is coupled to said motor and is configured to actuate said motor to control the rotation of said central rotatable shaft about said axis of rotation to maximize drag efficiency at the particular vehicle speed, and wherein said controller is coupled to said one or more air foils with said controller configured for pivoting each of said plurality of air foils to any position between and including a non-clocked position and a clocked position to redirect the flow of air exiting through the second opening to maximize drag efficiency at the particular vehicle speed.

19. A land vehicle comprising:
a trailer unit comprising one or more walls having an exterior surface; and
one or more drag reduction devices coupled to said exterior surface of said trailer unit with said one or more drag reduction devices configured to adjust air movement over and around the trailer unit as the land vehicle is driven on a surface at a particular vehicle speed, each one of said drag reduction devices comprising:
a housing having an inner housing portion coupled adjacent to said exterior surface and a pair of side housing portions extending from said inner housing portion, said housing defining a first opening and a second opening; and
a fan assembly contained within said housing, said fan assembly comprising:
a central rotatable shaft rotatable around an axis of rotation;
a plurality of fan blades coupled to and extending radially outwardly from said central rotatable shaft;
one or more plasma-controlled air foils pivotally coupled to each of said pair of side housing portions and positioned within said second opening, each one of said one or more plasma-controlled air foils configured to be movable to any position between and including a non-clocked position and a clocked position, with each one of said plurality of plasma-controlled air foils comprising:
a base substrate material;
an embedded electrode coupled to said base substrate material and electrically coupled to a DC or AC voltage source, with said DC or AC voltage source electrically coupled to said controller;
a surface electrode coupled to said base substrate material and electrically coupled to said DC or AC voltage source; and
a controller coupled to said central rotatable shaft or to said one or more plasma-controlled air foils, or to both said central rotatable shaft and said one or more air foils, and configured for controlling air flow through the fan assembly to maximize drag efficiency at the particular vehicle speed, wherein said controller directs said DC or AC voltage source to generate a high voltage pulse through each of said embedded electrode and said surface electrode to generate a plasma field in proximity to a surface of said one or more plasma-controlled air foils.

20. A land vehicle comprising:
a trailer unit comprising one or more walls having an exterior surface; and
one or more drag reduction devices coupled to said exterior surface of said trailer unit with said one or more drag reduction devices configured to adjust air movement over and around the trailer unit as the land vehicle is driven on a surface at a particular vehicle speed, each one of said drag reduction devices comprising:
a housing having an inner housing portion coupled adjacent to said exterior surface and a pair of side housing portions extending from said inner housing portion, said housing defining a first opening and a second opening; and
a fan assembly contained within said housing, said fan assembly comprising:
a central rotatable shaft rotatable around an axis of rotation;
a plurality of fan blades coupled to and extending radially outwardly from said central rotatable shaft;
one or more air foils pivotally coupled to each of said pair of side housing portions and positioned within said second opening, each one of said one or more air foils is configured to be movable to any position between and including a non-clocked position and a clocked position;
a mesh screen coupled over said first opening; and
a controller coupled to said central rotatable shaft or to said one or more air foils, or to both said central rotatable shaft and said one or more air foils, and configured for controlling air flow through the fan assembly to maximize drag efficiency at the particular vehicle speed,
wherein said mesh screen comprises a plasma actuated mesh screen that is electrically coupled a DC or AC voltage source, with said DC or AC voltage source electrically coupled to said controller, and
wherein said controller directs said DC or AC voltage source to generate a high voltage pulse through said plasma actuated mesh screen to generate a plasma field in proximity to a said plasma actuated mesh screen.

21. A land vehicle comprising:
a trailer unit comprising a top wall and a rear wall, with said top wall and said rear wall each having a cut out portion defining a cavity; and
one or more drag reduction devices housed within said cavity with said one or more drag reduction devices configured to adjust air movement over and around the trailer unit as the land vehicle is driven on a surface at a particular vehicle speed, each one of said drag reduction devices comprising:
a housing having an inner housing portion coupled adjacent to said rear wall and a pair of side housing portions extending from said inner housing portion, said housing defining a first opening aligned with said top wall and a second opening aligned with said rear wall; and
a fan assembly contained within said housing, said fan assembly comprising:

a central rotatable shaft rotatable around an axis of rotation;

a plurality of fan blades coupled to and extending radially outwardly from said central rotatable shaft;

one or more plasma-controlled air foils pivotally coupled to each of said pair of side housing portions and positioned within said second opening, each one of said one or more plasma-controlled air foils configured to be movable to any position between and including a non-clocked position and a clocked position; and a controller coupled to said central rotatable shaft or to said one or more plasma-controlled air foils, or to both said central rotatable shaft and said one or more air foils, and configured for controlling air flow through the fan assembly to maximize drag efficiency at the particular vehicle speed, wherein each one of said one or more plasma-controlled air foils comprises:

a base substrate material;

an embedded electrode coupled to said base substrate material and electrically coupled to a DC or AC voltage source, with said DC or AC voltage source electrically coupled to said controller;

a surface electrode coupled to said base substrate material and electrically coupled to said DC or AC voltage source; and wherein said controller directs said DC or AC voltage source to generate a high voltage pulse through each of said embedded electrode and said surface electrode to generate a plasma field in proximity to a surface of said one or more plasma-controlled air foils.

22. A drag reduction device for use adjusting air over and around a land vehicle as the land vehicle is driven on a surface, said drag reduction device comprising:

a housing having an inner housing portion coupled adjacent to an exterior surface and a pair of side housing portions extending from said inner housing portion, said housing defining a first opening and a second opening; and a fan assembly contained within said housing, said fan assembly comprising:

a central rotatable shaft rotatable around an axis of rotation;

a plurality of fan blades coupled to and extending radially outwardly from said central rotatable shaft;

one or more plasma-controlled air foils pivotally coupled to each of said pair of side housing portions and positioned within said second opening, each one of said one or more plasma-controlled air foils configured to be movable to any position between and including a non-clocked position and a clocked position; and a controller coupled to said central rotatable shaft or to said one or more plasma-controlled air foils, or to both said central rotatable shaft and said one or more air foils, and configured for controlling air flow through the fan assembly to maximize drag efficiency at the particular vehicle speed, wherein said controller directs said DC or AC voltage source to generate a high voltage pulse through each of said embedded electrode and said surface electrode to generate a plasma field in proximity to a surface of said one or more plasma-controlled air foils.

\* \* \* \* \*